(12) United States Patent
Niida et al.

(10) Patent No.: US 6,266,372 B1
(45) Date of Patent: *Jul. 24, 2001

(54) APPARATUS FOR IMAGE REPRODUCTION USING MOTION ESTIMATION

(75) Inventors: Mitsuo Niida, Kawasaki; Tetsuya Shimizu, Yokohama, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/876,109

(22) Filed: Jun. 13, 1997

Related U.S. Application Data

(63) Continuation of application No. 08/570,743, filed on Dec. 12, 1995, now abandoned, which is a continuation of application No. 08/221,249, filed on Mar. 30, 1994, now abandoned.

(30) Foreign Application Priority Data

| Mar. 31, 1993 | (JP) | 5-96865 |
| Mar. 31, 1993 | (JP) | 5-96866 |
| Mar. 31, 1993 | (JP) | 5-96867 |

(51) Int. Cl.$^7$ .................................................. H04N 7/18
(52) U.S. Cl. .............................. 375/240.16; 375/240.15
(58) Field of Search .................................... 348/416, 415, 348/411, 405, 414, 413, 699, 700, 420, 421, 461, 466, 845.2; 386/1, 46, 50; 375/240.16, 240.15

(56) References Cited

U.S. PATENT DOCUMENTS

| 4,729,021 | * | 3/1988 | Kondo | 348/415 |
| 5,134,478 | * | 7/1992 | Golin | 348/419 |
| 5,150,210 | * | 9/1992 | Hoshi et al. | 348/409 |
| 5,151,784 | * | 9/1992 | Lavagetto et al. | 348/416 |
| 5,212,549 | * | 5/1993 | Ng et al. | 348/420 |
| 5,243,428 | * | 9/1993 | Challapali et al. | 348/420 |
| 5,247,363 | * | 9/1993 | Sun et al. | 348/416 |
| 5,301,019 | * | 4/1994 | Citta | 348/418 |
| 5,365,604 | * | 11/1994 | Kwok et al. | 382/54 |
| 5,377,051 | * | 12/1994 | Lane et al. | 360/33.1 |
| 5,386,234 | * | 1/1995 | Veltmann et al. | 348/411 |
| 5,400,076 | * | 3/1995 | Iwamura | 348/416 |
| 5,410,553 | * | 4/1995 | Choon | 348/412 |
| 5,416,600 | * | 5/1995 | Matsumi et al. | 348/420 |
| 5,442,400 | * | 8/1995 | Sun et al. | 348/411 |
| 5,450,506 | * | 9/1995 | Gillard et al. | 348/409 |
| 5,455,629 | * | 10/1995 | Sun et al. | 348/416 |
| 5,495,298 | * | 2/1996 | Uchida et al. | 348/615 |
| 5,508,744 | * | 4/1996 | Savatier | 348/416 |
| 5,561,532 | * | 10/1996 | Ohnishi et al. | 348/416 |
| 5,621,467 | * | 4/1997 | Chien et al. | 348/409 |

* cited by examiner

Primary Examiner—Andy Rao
(74) Attorney, Agent, or Firm—Robin, Blecker & Daley

(57) ABSTRACT

There is provided an image reproducing apparatus comprising a reproducing circuit for reproducing an image signal which was divided into blocks and encoded from a recording medium, a decoding circuit for decoding the image signal reproduced by the reproducing circuit, a movement detection circuit for respectively detecting and outputting movements of a plurality of blocks around a block including the image signal which cannot be decoded by the decoding circuit, and a constructing means for constructing an image signal for a block including the undecodable image signal, wherein a precision of a movement estimation of the undecodable image signal can be raised and an image which is hardly visually deteriorated can be obtained.

14 Claims, 12 Drawing Sheets

FIG. 10

| $B_{i-1,j-1}$ | $B_{i,j-1}$ | $B_{i+1,j-1}$ |
|---|---|---|
| $B_{i-1,j}$ | $B_{i,j}$ | $B_{i+1,j}$ |
| $B_{i-1,j+1}$ | $B_{i,j+1}$ | $B_{i+1,j+1}$ |
| $B_{i-1,j+2}$ | $B_{i,j+2}$ | $B_{i+1,j+2}$ |

FIG. 12

| $B_{i-1,j-1}$ | $B_{i,j-1}$ | $B_{i+1,j-1}$ |
|---|---|---|
| $B_{i-1,j}$ | $B_{i,j}$ | $B_{i+1,j}$ |
| $B'_{i-1,J}$ | $B'_{i,j}$ | $B'_{i+1,J}$ |
| $B_{i-1,j+1}$ | $B_{i,j+1}$ | $B_{i+1,j+1}$ |
| $B_{i-1,j+2}$ | $B_{i,j+2}$ | $B_{i+1,j+2}$ |

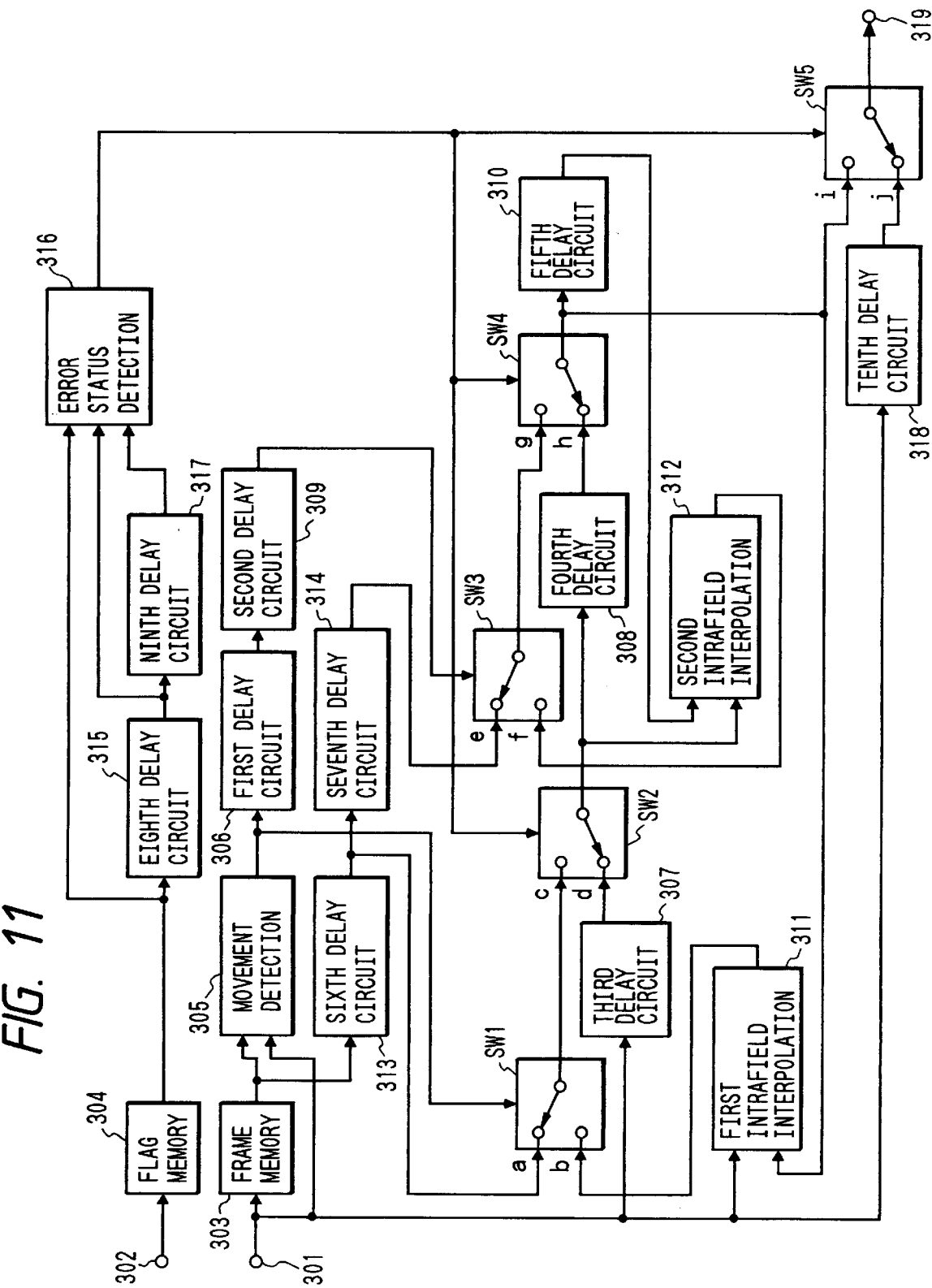

| FIG. 13A | FIG. 13B |

FIG. 14

APPARATUS FOR IMAGE REPRODUCTION USING MOTION ESTIMATION

This is a continuation application under 37 CFR 1.62 of prior application Ser. No. 08/570,743 filed on Dec. 12, 1995 (abandoned) which is a continuation of Ser. No. 08/221,249 filed on Mar. 30, 1994 (abandoned).

BACKGROUND OF THE INVENTION

1. Field of the Invention

The present invention relates to an image reproducing apparatus and, more particularly, to an image reproducing apparatus for concealing undecodable data of a video signal which was high efficiently encoded and for reproducing such data.

2. Related Background Art

An orthogonal transformation encoding method is known as a technique for highly efficiently compressing and encoding an image signal. According to such a method, after the image signal has been divided into blocks every predetermined number of pixels in a lump, an orthogonal transformation such as a discrete cosine transformation (DCT) or the like is executed. A quantization, an entropy encoding or the like is executed on coefficients after completion of the transformation.

According to such a method, since the encoding is executed on a block unit basis, when an error occurs in the encoding data, a code error occurs on a block unit basis. Since a variable length code is frequently used, a decoding error is propagated over a plurality of blocks, so that it results in a large deterioration of the image.

An interframe interpolation in which an error block is replaced by the image of a previous frame is known as a means for obtaining a reproduction image by interpolating and concealing such an error block.

FIG. 1 shows a concealing operation by interframe interpolation. Now, assuming that a block X of a frame #n cannot be reproduced, the interframe interpolation is realized by replacing the data of the block X by the reproduction data of a block A' at the same position on a screen of a previous frame #n-1 and by reproducing the data.

According to such an interframe interpolation, however, when a movement of an image is hard, the interpolation data is deviated from the image data of a peripheral block in the same field with respect to the time and differs from the image data. Therefore, when the data of the error block is replaced by the interpolation data, it becomes a visually large obstruction.

A method of using image data in the same field as interpolation data is also considered. In this case, however, although there is a correlation as compared with that of the interframe interpolation with regard to the time, a correlation is contrarily low with respect to the space.

Therefore, there is also considered a method whereby a movement of an unreproducible block is estimated by the image data of an upper block of the unreproducible block. The interframe interpolation and the intrafield interpolation are switched in accordance with the movement. In this case, however, since the movement of the unreproducible block is estimated by only the image data of the upper block, it is likely to erroneously estimate the movement and there is a possibility that the error data is interpolated by data of a low correlation.

SUMMARY OF THE INVENTION

Under such circumstances, it is an object of the invention to solve the problems mentioned above.

Another object of the invention is to provide an image reproducing apparatus which can obtain an image in which the deterioration of eyesight is small by raising the precision of a movement estimation of an undecodable block.

Under such objects, according to the present invention, as one embodiment, there is provided an image reproducing apparatus comprising: (a) reproducing means for reproducing an image signal which was block encoded from a recording medium; (b) decoding means for decoding the image signal reproduced by the reproducing means; (c) movement detecting means for detecting movement of each of a plurality of blocks around a block including the image signal which cannot be decoded by the decoding means and for outputting; and (d) constructing means for constructing an image signal for the image signal of the block including the undecodable image signal on the basis of a plurality of outputs of the movement detecting means.

Still another object of the invention is to obtain a good image even in the case where movement information from a plurality of blocks around an undecodable block differs.

Under such an object, according to the invention, as one embodiment, there is provided an image processing device comprising: (a) input means for inputting an image signal which was divided into blocks; (b) movement detecting means for detecting the presence or absence of a movement of each of the plurality of blocks; and (c) concealing means for concealing a target block by using another block on the basis of an output of the movement detecting means, wherein in the case where the result of the detection of the movement detecting means differs, the concealing means divides the target block into a plurality of portions and can execute different concealing processing on each of the plurality of portions.

The above and other objects and features of the present invention will become apparent from the following detailed description and the appended claims with reference to the accompanying drawings.

BRIEF DESCRIPTION OF THE DRAWINGS

FIG. 10 is a diagram for explaining the interpolating operation by a circuit in FIG. 5;

FIG. 11 is a block diagram showing another example of a construction of an interpolation circuit in the apparatus of FIG. 4;

FIG. 12 is a diagram for explaining the interpolating operation by a circuit in FIG. 11;

FIG. 14 is a diagram for explaining the interpolating operation according to FIGS. 13A and 13B;

DETAILED DESCRIPTION OF THE PREFERRED EMBODIMENTS

Embodiments of the present invention will be described hereinbelow. The operation of a recording system of a digital VTR as an embodiment of the invention will be first described.

Figure 2:
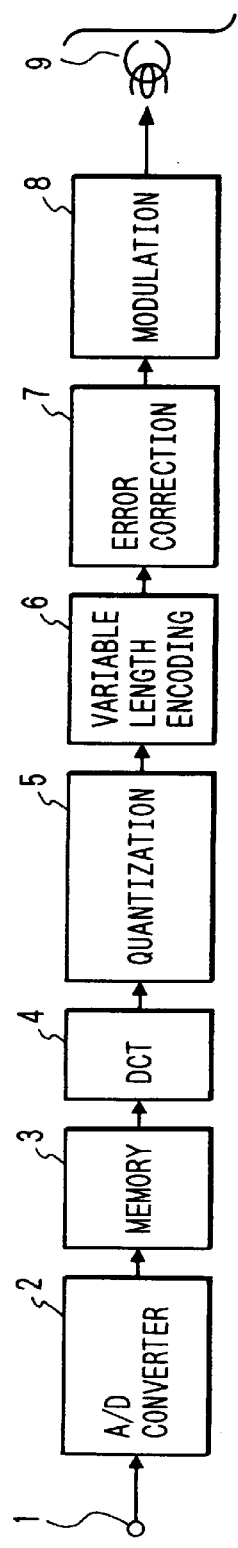
FIG. 2 is a block diagram showing a construction of a recording system of a digital VTR in an embodiment of the present invention.

FIG. 2 is a block diagram of a recording system of the digital VTR as an embodiment of the invention.

In FIG. 2, reference numeral 1 denotes an input terminal of image data from a video camera or the like; 2 an analog-digital (A/D) converter; 3 a frame memory; 4 a DCT circuit to perform a discrete cosine transformation (hereinafter, referred to as a DCT) as an orthogonal transformation; and 5 a quantization circuit to quantize each of the frequency coefficients of the image data which was DCT transformed.

Reference numeral 6 denotes a variable length encoding circuit to allocate variable length codes to the quantized data; 7 an error correction encoding circuit for error correction encoding the encoding data in order to record or transmit the data to a medium; 8 a modulation circuit to perform a modulation suitable for the medium or transmission path; and 9 a recording circuit.

The operation of the above recording system will now be described hereinbelow with reference to FIG. 2.

Figure 1:
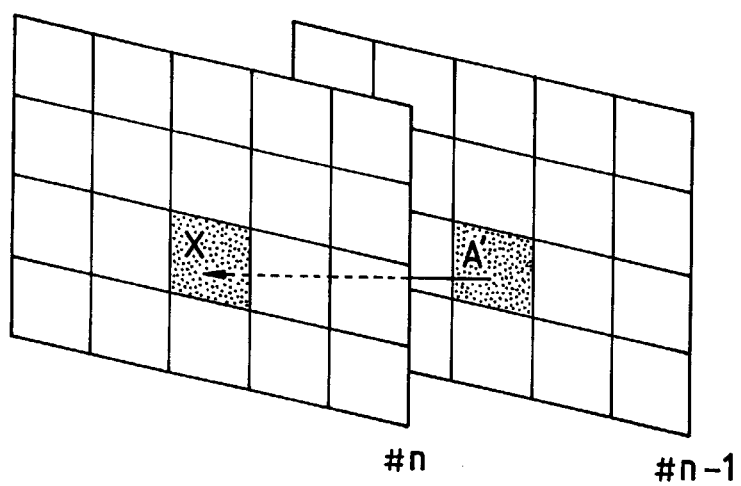
FIG. 1 is a diagram for explaining the operation of an interframe interpolation.
Figure 3:
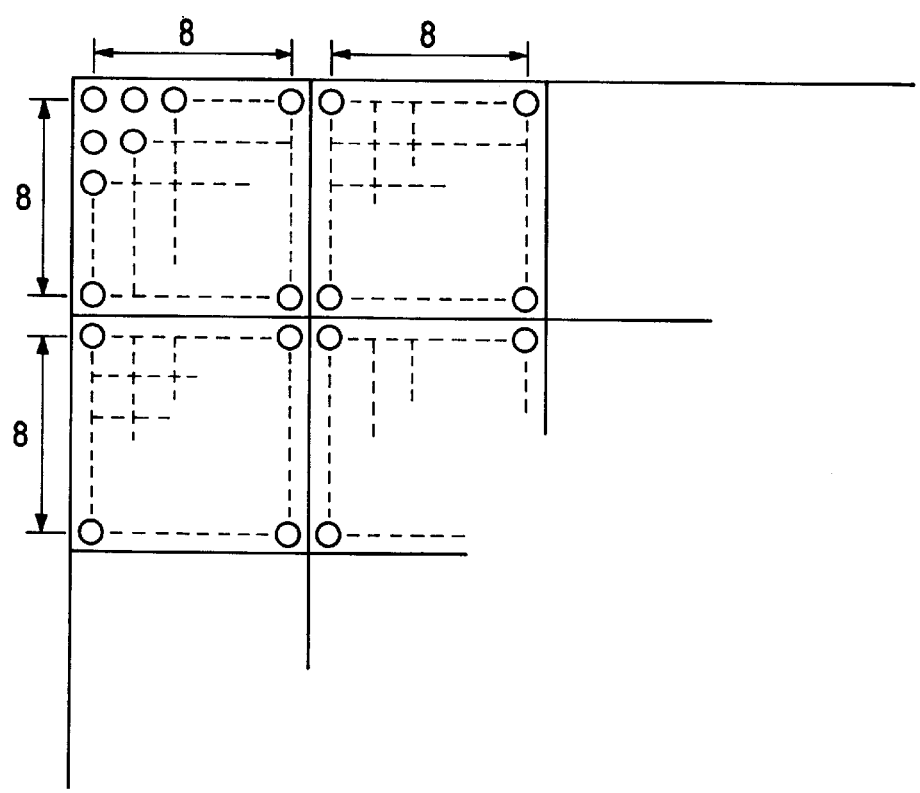
FIG. 3 is a diagram for explaining the block formation in an apparatus of FIG. 2.

The image data which was input from the input terminal 1 is converted from the analog signal to the 8-bit digital signal by the A/D converter 2 and is written into the frame memory 3. The image data is shuffled and is divided into blocks on a unit basis of (8 pixels)×(8 pixels) as shown in FIG. 3 (showing an arrangement of pixels of an image).

The image data is read out from the memory for every block and is supplied to the DCT circuit 4. The DCT circuit 4 DCT transforms the image data for every block and converts the image data from the space data to the frequency data and generates 64 (8×8) frequency coefficients.

Generally, an image has a strong correlation. When the image data is DCT transformed and is converted into the frequency data, components can be concentrated into a low frequency area. Further, since a sensitivity in a high frequency area is dull on human eyesight characteristics, even if the image is slightly coarsely quantized, its deterioration is not conspicuous. By using such a phenomenon, the quantization circuit 5 quantizes the frequency coefficients of each block which are supplied from the DCT circuit 4 by coarse steps as a frequency of the area becomes high.

The image is zigzag scanned from the low frequency area to the high frequency area by the variable length encoding circuit 6 and an amount of information of the image is reduced so as to sequentially allocate variable length codes (for example, two-dimensional Huffman codes) to the quantized coefficients in accordance with the order.

The data which was variable length encoded by the variable length encoding circuit 6 is subsequently subjected to the encoding for error correction by the error correction encoding circuit 7 by using a Reed Solomon product code or the like.

The data which was error correction encoded by the error correction encoding circuit 7 is subjected to a modulation suitable for the recording medium or transmission path by the modulation circuit 8 and is recorded onto a magnetic tape by the recording circuit 9.

Figure 4:
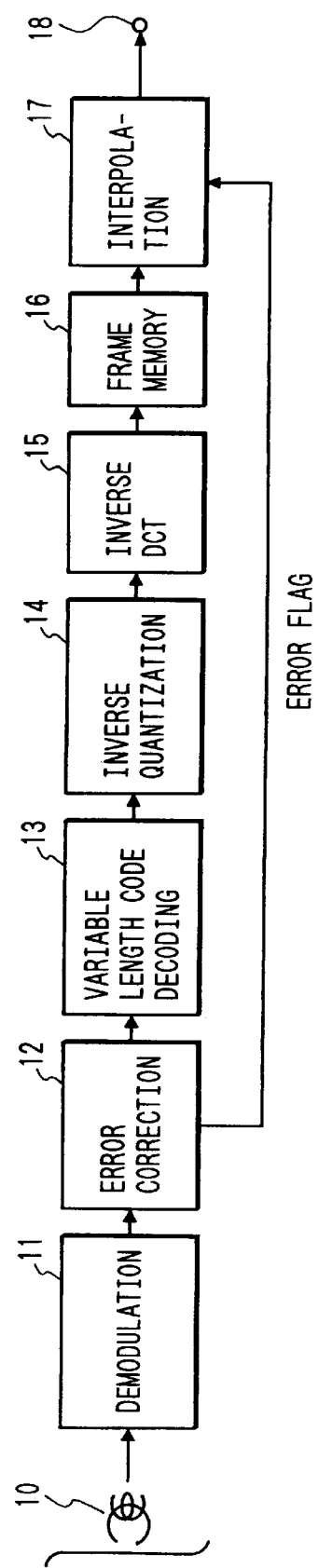
FIG. 4 is a block diagram showing a construction of a reproducing system of the digital VTR in an embodiment of the invention.

The case of reproducing the image data which was recorded as mentioned above will now be described. FIG. 4 is a block diagram showing a construction of a reproducing system of a digital VTR. In FIG. 4, the image data reproduced by a reproduction circuit 10 is demodulated by a demodulation circuit 11 in correspondence to the recording mode. After that, the demodulated data is output to an error correction circuit 12.

After a code error correction was performed with respect to the input image data by the correction circuit 12, the image data is decoded by a variable length decoding circuit 13. In this instance, with regard to error uncorrectable data (hereinafter, referred to as error data), an error flag is output to an interpolation circuit 17. The decoded data is inversely quantized by an inverse quantization circuit 14. After that, it is inversely DCT transformed by an inverse DCT circuit 15 and is transformed from the data of a frequency area to the data of a space area. An output of the inverse DCT circuit 15 is written into a frame memory 16. The data written in the frame memory 16 is deshuffled and is read out in accordance with a raster scan of a monitor or the like. Erroneous data is replaced by interpolation in the interpolation circuit 17. After that, the data is output from an output terminal 18 and is displayed on the monitor or the like.

Figure 5:
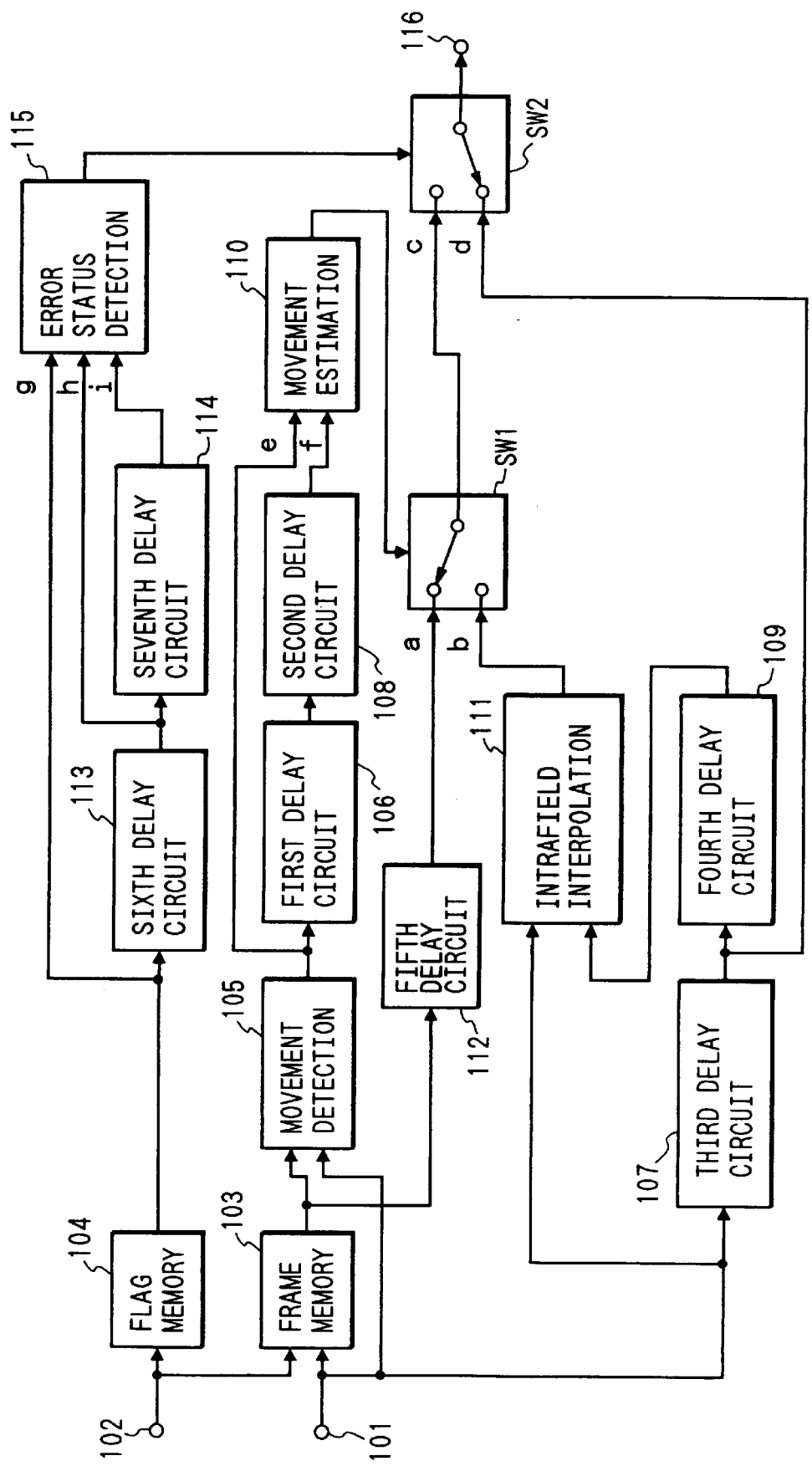
FIG. 5 is a block diagram showing an example of a construction of an interpolation circuit in an apparatus of FIG. 4.

The first embodiment of the invention will now be described. FIG. 5 is a block diagram showing an example of a construction of the interpolation circuit 17.

In FIG. 5, the image data which was output from the frame memory 16 is input from an input terminal 101. An error flag corresponding to the input image data is input from an input terminal 102. The input image data is written into a frame memory 103, is delayed by a time corresponding to one frame and is supplied to a movement detection circuit 105 and a fifth delay circuit 112. In this instance, when the error flag is input, the input image data is not written but the image data which has already been stored remains as it is. The input error flag is also supplied to a flag memory 104, by which it is delayed by a time corresponding to one frame and is supplied to a sixth delay circuit 113 and an error status detection circuit 115.

Reference numeral 105 denotes the movement detection circuit for obtaining a difference between the input image data and an output of the frame memory 103, namely, the image data which is one frame prior to the input image data, for addition integrating the absolute value of the difference every block, and thereafter, for comparing the addition integration data with a predetermined value. As a result of the comparison, when the above addition integration data is smaller than the predetermined value, the movement detection circuit 105 judges that there is no movement in the block, so that it generates a low-level signal "0".

When the addition integration data is larger than the predetermined value, it is decided that the block has a movement, so that a high-level signal "1" is generated. Those outputs of the movement detection circuit 105 are hereinafter referred to as movement data. The movement data which was output from the movement detection circuit 105 is input to a first delay circuit 106. In the embodiment, a delay time of the first delay circuit 106 is set so that the timing of the block including the output image data of a third delay circuit 107 having a delay time of 4H coincides with the timing of the movement data which is output from the first delay circuit 106.

The movement data which is output from the first delay circuit 106 is input to a second delay circuit 108. A delay time of the second delay circuit 108 is set so that the timing of the movement data which is output from the second delay circuit 108 coincides with the timing of the block including the image data which is output from a fourth delay circuit 109 having a delay time of one H.

An output of the second delay circuit 108 is input to a movement estimation circuit 110 together with the movement data which is output from the movement detection circuit 105. An intrafield interpolation circuit 111 produces intrafield interpolation data as will be explained herein and supplies to a (b) terminal of a switch SW1.

The switch SW1 is controlled by an output of the movement estimation circuit 110. When the output of the movement estimation circuit 110 is equal to "0", the switch SW1 is connected to an (a) terminal. When it is equal to "1", the switch is connected to the (b) terminal. The switch SW1 is connected to the (a) terminal when the output of the movement estimation circuit 110 is equal to "0". The switch SW1 is connected to the (b) terminal when the output of the movement estimation circuit 110 is equal to "1". Thus, a selection is made between an output (interframe interpolation data) of the fifth delay circuit 112 to delay the data by a time of 1H as one-frame preceding pixel data and intrafield interpolation data from the intrafield interpolation circuit 111 from the input image data and an output of the fourth delay circuit 109.

An output of the switch SW1 is input to a (c) terminal of a switch SW2. A selection between the output of the switch SW1 as interpolation data and the output image data of the third delay circuit 107 as image data which was correctly reproduced is performed by the switch SW2.

An output of the flag memory 104 is supplied to the sixth delay circuit 113. A delay time of the sixth delay circuit 113 is set so as to generate an error flag of a pixel block that is output from the third delay circuit 107.

An output of a seventh delay circuit 114 is supplied to the error status detection circuit 115. A delay time of the seventh delay circuit 114 is set so as to generate an error flag of a pixel block which is output from the fourth delay circuit 109.

Outputs of the flag memory 104 and the sixth delay circuit 113 are also supplied to the error status detection circuit 115, respectively.

The error status detection circuit 115 generates a signal to control the switch SW2 by logical arithmetic operations, which will be explained herein, from the above three input data.

The output of the switch SW1 is supplied to the (c) terminal of the switch SW2 and output image data from the third delay circuit 107 is supplied to a (d) terminal. The switch SW2 is connected to the (d) terminal when an output of the error status detection circuit 115 is equal to "0". The switch SW2 is connected to the (c) terminal when the output of the error status detection circuit 115 is equal to "1".

Thus, either one of the output of the switch SW1 as interpolation data and the output of the third delay circuit 107 as pixel data which was correctly reproduced is selected and is output to the outside through an output terminal 116.

Figure 6:
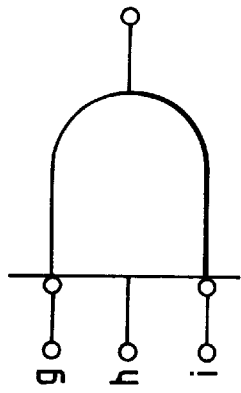
FIG. 6 is a diagram showing a movement estimation circuit in FIG. 5.

The movement estimation circuit 110 is constructed by, for example, an AND circuit as shown in FIG. 6 and executes an AND arithmetic operation such that an output is set to "1" only when both of inputs from two input terminals (e) and (f) are equal to "1".

Figure 7:
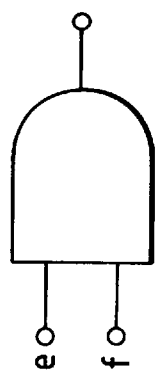
FIG. 7 is a diagram showing an error status detection circuit in FIG. 5.

The error status detection circuit 115 is constructed as shown in, for instance, FIG. 7 and executes an AND arithmetic operation such that an output is set to "1" only when inputs from input terminals (g) and (i) are equal to "0" and an input from an input terminal (h) is equal to "1".

Figure 8:
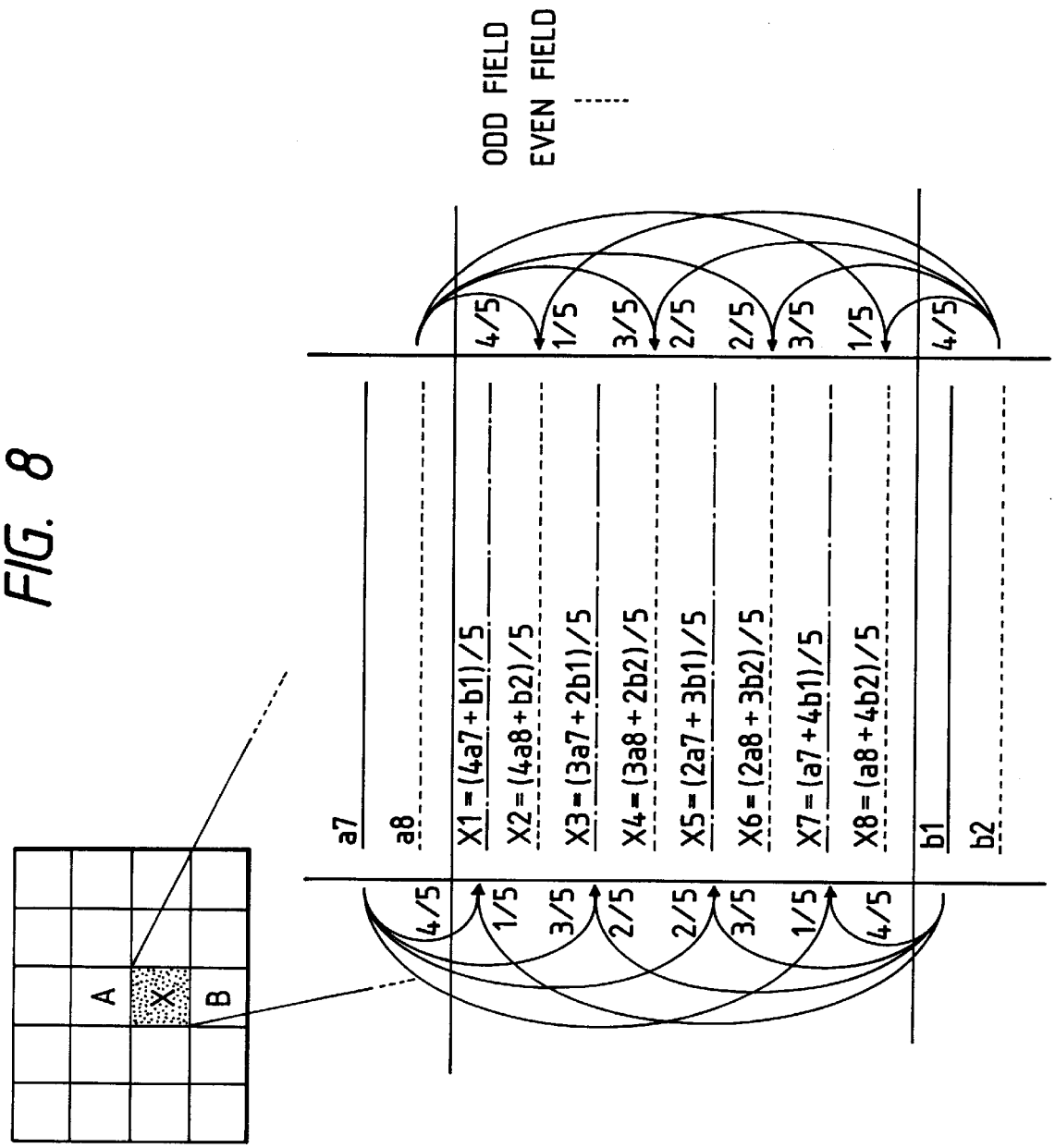
FIG. 8 is a diagram for explaining an intrafield interpolation in the embodiment of the invention.

The operation of the intrafield interpolation circuit 111 will now be described. It is now assumed that the block X in FIG. 8 is an undecodable block (hereinafter, referred to as an error block). In the embodiment, the case where processes are executed on a field unit basis will now be described. For the processes of a field unit, odd field lines x1, x3, x5, and x7 of the error block X are subjected to an intrafield linear interpolation by a line a7 of a block A as a line of the same field that is nearest to the top line x1 of the odd field and a line b1 of a block B as a line of the same field that is nearest to the bottom line x7 among the lines of the blocks (blocks A and B in this case) which were correctly decoded.

After completion of the interpolating processes of the odd field, the processes of the even field are executed. In a manner similar to the case of the odd field lines mentioned above, even field lines x2, x4, x6, and x8 of the error block X are also subjected to the intrafield linear interpolation by a line a8 of the block A and a line b2 of the block B. That is, in the odd field, the data of each line of the block X is calculated as follows.

$$x1=(4 \times a7+b1)/5$$

$$x3=(3 \times a7+2 \times b1)/5$$

$$x5=(2 \times a7+3 \times b1)/5$$

$$x7=(a7+4 \times b1)/5$$

In the even field, the data of each line of the block X is calculated as follows.

$$x2=(4 \times a8+b2)/5$$

$$x4=(3 \times a8+2 \times b2)/5$$

$$x6=(2 \times a8+3 \times b2)/5$$

$$x8=(a8+4 \times b2)/5$$

The data in which the intrafield concealment was performed to the error block as mentioned above is sent to the (b) terminal of the switch SW1.

Although the embodiment has been described with respect to the case of field processes, the processes can be also performed on a frame unit basis. In such a case, the data of each line of the block X is subjected to a linear interpolation by using the line a8 of the block A and the line b1 of the block B.

Figure 9:
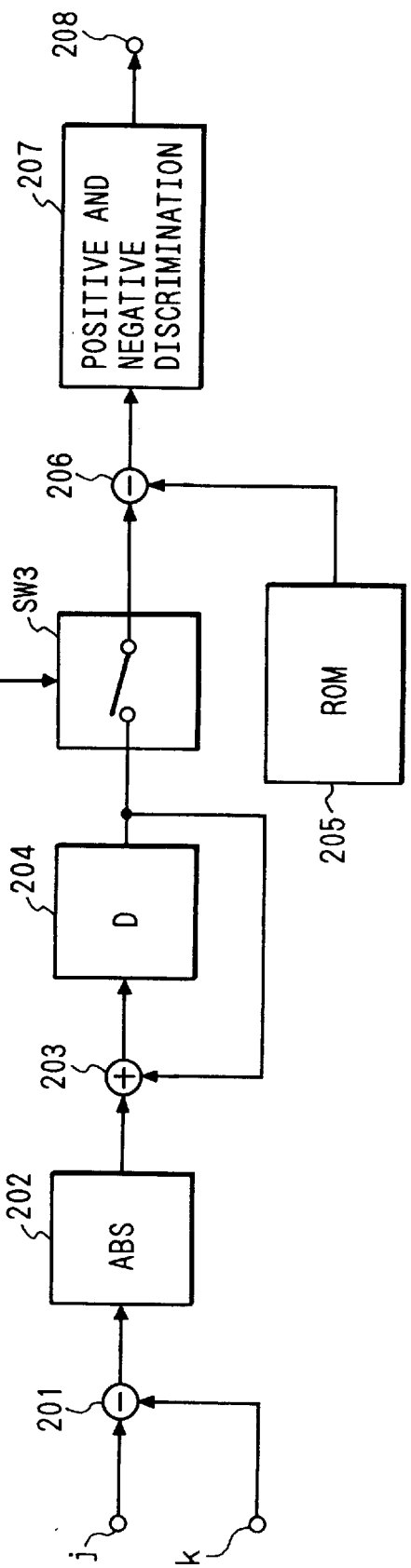
FIG. 9 is a block diagram showing a construction of a movement detection circuit in FIG. 5.

FIG. 9 shows an example of a construction of the movement detection circuit 105 which is used in the invention. In FIG. 9, reference numeral 201 denotes a first subtraction circuit to perform a subtraction between the input signal of an input terminal (j) and the input signal of an input terminal (k); 202 an absolute value operation circuit to calculate the absolute value of an output signal of the first subtraction circuit 201; and 203 a first addition circuit to perform an addition between an output of the absolute value operation circuit 202 and an output of a pixel delay circuit 204, which will be explained herein.

Reference numeral 204 denotes the delay circuit to delay the output of the first addition circuit 203; SW3 a switch to control an output from the delay circuit 204; 205 a read only memory (ROM) in which data to compare with the output of the delay circuit 204 has previously been stored; 206 a second subtraction circuit to calculate a difference between the output of the delay circuit 204 and an output of the ROM 205; 207 a positive and negative discrimination circuit to discriminate whether the result of the output of the second subtraction circuit 206 is positive or negative; and 208 an output terminal.

Input terminals (j) and (k) correspond to two input terminals (not shown) provided for the movement detection circuit 105 in FIG. 5.

The operation of the movement detection circuit 105 shown in FIG. 9 will now be described. The input image data is input from the input terminal (j). The image data from the frame memory 103 is input from the input terminal (k). Namely, the image data from the input terminals (j and k) has a time difference of just one frame. Therefore, when attention is now paid to one certain pixel, in the case where a movement is small on the screen, since the absolute value of the difference for one frame is small, an output of the absolute value operation circuit 202 is small.

On the contrary, when the movement is large on the screen, since the absolute value of the difference for one frame is large, the output of the absolute value operation circuit 202 is large. The output of the absolute value operation circuit 202 is hereinafter referred to as a differential absolute value.

The first addition circuit 203 and the delay circuit 204 add the differential absolute values mentioned above with respect to one block. The delay circuit 204 is controlled by a control circuit (not shown) so as to add the foregoing differential absolute values every pixel block and the switch SW3 is controlled so as to add the differential absolute values of one block and to be closed at the end of the addition. The output of the delay circuit 204 as a differential absolute value of one block is hereinafter referred to as a differential absolute value sum.

The second subtraction circuit 206 performs a subtraction between the foregoing differential absolute value sum and the output of the ROM 205. The positive and negative discrimination circuit 207 discriminates whether the output of the second subtraction circuit 206 is positive or negative, thereby comparing the comparison value which has previously been stored in the ROM 205 and the differential absolute value sum.

In the case where the differential absolute value sum is larger than the comparison value, the positive and negative discrimination circuit 207 generates "1" indicative of the presence of the movement. When the differential absolute value sum is smaller than the comparison value, "0" indicative of the absence of the movement is generated. The result of the discrimination is calculated every block.

The comparison value which has previously been stored in the ROM 205 is set to, for example, the half value of the maximum total value of all of the pixels constructing the block or the like.

The operation of an image signal reproducing apparatus of the embodiment will now be described with reference to FIG. 10. FIG. 10 shows pixel blocks on the screen.

Now assuming that the image data of the block Bi,j+1 has been output from the input terminal 101, the pixel data of Bi,j is output from the third delay circuit 107, the image data of Bi,j which is one frame preceding to the input image data is output from the fifth delay circuit 112, and the image data of Bi,j−1 is output from the fourth delay circuit 109.

In this instance, the block movement data of Bi,j+1 is output from the movement detection circuit 105, the block movement data of Bi,j is output from the first delay circuit 106, and the block movement data of Bi,j−1 is output from the second delay circuit 108.

The error flag of Bi,j+1 is output from the flag memory 104, the error flag of Bi,j is output from the sixth delay circuit 113, and the error flag of Bi,j−1 is output from the seventh delay circuit 114.

In this instance, in the case where the blocks Bi,j−1 and Bi,j+1 are the blocks which were correctly reproduced and the block Bi,j is the error block, the output of the error status detection circuit 115 is set to "1" and the switch SW2 is connected to the (c) terminal, thereby setting into a state in which the block Bi,j is interpolated.

The interpolation of the block Bi,j differs in dependence on the movement data which is output from the movement detection circuit 105 and the second delay circuit 108, respectively.

Namely, when both of the blocks Bi,j+1 and Bi,j−1 have no movement, both of the outputs of the movement detection circuit 105 and the second delay circuit 108 are set to "0" and the output of the movement estimation circuit 110 is set to "0".

Or, when either one of the blocks Bi,j+1 and Bi,j−1 has no movement, either one of the outputs of the movement detection circuit 105 and the second delay circuit 108 is set to "0" and the output of the movement estimation circuit 110 is set to "0".

In this instance, the switch SW1 is connected to the (a) terminal and the block Bi,j is interframe interpolated. In the case where both of the blocks Bi,j+1 and Bi,j−1 have movements, both outputs of the movement detection circuit 105 and the second delay circuit 108 are equal to "1" and the output of the movement estimation circuit 110 is equal to "1". In this instance, the switch SW1 is connected to the (b) terminal and the block Bi,j is intrafield interpolated.

That is to say, the data of the error block is interpolated on the basis of the movement data of the blocks which are adjacent to the error block in the upper and lower directions.

The error status detection circuit 115 is not limited to the AND operation but another operating means for executing an OR operation or the like can be also used. Since the image signal reproducing apparatus of the embodiment has been constructed as mentioned above, the interpolation can be executed at a high precision.

As mentioned above, according to the embodiment, when the movement of the error block is estimated, by using the movement data of the adjacent blocks, an erroneous movement estimation is hardly performed and the precision of the movement estimation can be remarkably improved. Thus, a situation such that the error block is interpolated by using the image signal of a small correlation is prevented. The deterioration of the picture quality of the interpolated image can be reduced.

In the above first embodiment, when the movement data of the upper and lower blocks of the error block are different, the intraframe interpolation has forcedly been executed. However, in the case where the movement estimation was performed as mentioned above, there is considered a situation such that, in the data of the error block, the data having a high correlation with the image of the previous frame and the data having a low correlation mixedly exist. There is, consequently, a fear such that the reproduction image deteriorates for the image data of a low correlation.

An image reproducing apparatus which can solve the problems as mentioned above will now be described hereinbelow.

FIG. 11 is a block diagram showing another example of a construction of the interpolation circuit 17 in FIG. 4.

In FIG. 11, the image data which was output from the frame memory 16 is input from an input terminal 301. An error flag corresponding to the input image data is input from an input terminal 302. The input image data is written into a frame memory 303 and is delayed by a time of one frame and is supplied to a movement detection circuit 305 and a sixth delay circuit 313. In this instance, in the case where the error flag was input, the input image data is not written but the image data which has already been stored remains as it is. The input error flag is also input to a flag memory 304, by which it is delayed by a time of one frame and is supplied to an eighth delay circuit 315 and an error status detection circuit Reference 316.

Reference numeral 305 denotes the movement detection circuit for obtaining a difference between the input image data and the output image data from the frame memory 303, for addition integrating the absolute value of the difference every block, and for comparing the addition integration data with a predetermined value. As a result of the comparison, when the addition integration data is smaller than the predetermined value, the movement detection circuit 305 decides that there is no movement with respect to the block, so that a low level signal of "0" is generated.

When the addition integration data is larger than the predetermined value, it is judged that the block has a movement, so that a high level signal of "1" is generated.

The movement data which was generated from the movement detection circuit is input to a first delay circuit 306 to execute a delay of a time of four lines.

In the embodiment, a delay time of the first delay circuit 306 is set so that the timing of the pixel block including the output data of a third delay circuit 307 for performing a delay of two lines, which will be explained herein, and the output data of a fourth delay circuit 308 for performing a delay of two lines coincides with the timing of the movement data which is generated from the first delay circuit 306.

The movement data which is generated from the first delay circuit 306 is input to a second delay circuit 309 for performing a delay of four lines. A delay time of the second delay circuit 309 is set so that the timing of the movement data which is generated from the second delay circuit 309 coincides with the timing of the pixel block including the image data that is output from a fifth delay circuit 310 for performing a delay of one line, which will be explained herein.

An output of a first intrafield interpolation circuit 311 is input to the (b) terminal of the switch SW1. The switching operation of the switch SW1 is controlled by an output of the movement detection circuit 305. When the output of the movement detection circuit is equal to "0", the switch SW1 is connected to the (a) terminal. When it is equal to "1", the switch is connected to the (b) terminal.

The input image data is supplied to the first intrafield interpolation circuit 311 together with an output of a fourth switch SW4. As will be explained herein, intrafield interpolation data for the lower half portion of the error block is calculated by using the input image data and the output of the switch SW4. When the output of the movement detection circuit 305 is equal to "0", the switch SW1 is connected to the (a) terminal. When it is equal to "1", the switch SW1 is connected to the (b) terminal.

Due to this, either one of the output (interframe interpolation data) of the sixth delay circuit 313 for performing a delay of two lines as image data of one frame preceding and the intrafield interpolation data is selected.

An output of the third delay circuit 307 is input to the (d) terminal of the switch SW2. The output of the switch SW1 is input to the (c) terminal of the switch SW2. The switch SW2 selects either one of the output of the switch SW1 as interpolation data and the output image data of the third delay circuit 307 as image data which was correctly reproduced.

An output of a second intrafield interpolation circuit 312 is input to an (f) terminal of the switch SW3. The switch SW3 is controlled by a movement data which is generated from the second delay circuit 309. When the movement data output is equal to "0", the switch SW3 is connected to an (e) terminal. When it is equal to "1", the switch SW3 is connected to the (f) terminal.

The output of the switch SW2 is input to the second intrafield interpolation circuit 312 together with an output of the fifth delay circuit 310. Intrafield interpolation data for the upper half portion of the error block is calculated by using the output of the switch SW2 and the output of the fifth delay circuit 310.

When the movement data output of the second delay circuit 309 is equal to "0", the switch SW3 is connected to the (e) terminal. When it is equal to "1", the switch SW3 is connected to the (f) terminal. Thus, either one of the output (interframe interpolation data) of a seventh delay circuit 314 to perform a delay of two lines as pixel data of one frame preceding and the intrafield interpolation data is selected.

An output of the fourth delay circuit 308 is input to an (h) terminal of the switch SW4. On the other hand, the output of the switch SW3 is supplied to a (g) terminal of the switch SW4. Either one of the output of the switch SW3 as interpolation data and the output data of the fourth delay circuit 308 is selected.

An output of the flag memory 304 is supplied to the eighth delay circuit 315 for performing a delay of four lines and to the error status detection circuit 316. An output of the eighth delay circuit 315 is supplied to a ninth delay circuit 317 for performing a delay of four lines and to the error status detection circuit 316. An output of the ninth delay circuit 317 is supplied to the error status detection circuit 316.

An output of the error status detection circuit 316 is set to "1" only when the output of the flag memory 304 and the output of the ninth delay circuit 317 are equal to "0" and the output of the eighth delay circuit 315 is equal to "1". The output of the error status detection circuit 316 is input to the switches SW2, SW4, and SW5, respectively.

The output of the switch SW4 is supplied to an (i) terminal of the switch SW5. An output of a tenth delay circuit 318 for performing a delay of four lines is supplied to a (j) terminal. When the output of the error status detection circuit 316 is equal to "0", the switch SW5 is connected to the (j) terminal. When the output of the error status detection circuit 316 is equal to "1", the switch SW5 is connected to the (i) terminal. Thus, either one of the output of the switch SW4 and the output of the ninth delay circuit 317 as image data which was correctly reproduced is selected and is output to the outside through an output terminal 319.

The operation will now be described with reference to FIG. 12. FIG. 12 shows pixel blocks on a screen. $B_{x,j}$ and $B'_{x,j}$ (x is an arbitrary integer) denote two upper and lower portions when the same block is divided into two upper and lower portions.

Now, assuming that the image data of the block $B_{i,j+1}$ was output from the input terminal 301, the image data of $B_{i,j}$ is generated from the tenth delay circuit 318. The image data of $B'_{i,j}$ of one frame preceding is generated from the sixth delay circuit 313. The image data of Bi,j of one frame preceding is generated from the seventh delay circuit 314.

In this instance, the block movement data of Bi,j+1 is generated from the movement detection circuit 305. The block movement data of Bi,j and B'i,j is generated from the first delay circuit 306. The block movement data of Bi,j−1 is generated from the second delay circuit 309.

An error flag of Bi,j+1 is output from the flag memory 304. The error flags of Bi,j and B'i,j are generated from the eighth delay circuit 315. The error flag of Bi,j−1 is generated from the ninth delay circuit 317.

In this instance, in the case where both of the blocks Bi,j−1 and Bi,j+1 are correctly decoded and the blocks comprising Bi,j and B'i,j are error uncorrectable (undecodable) blocks, the output of the error status detection circuit 316 is set to "1". The switches SW2, SW4, and SW5 are respectively connected to the (c), (g), and (i) terminals, thereby setting into a state in which the blocks Bi,j and B'i,j are interpolated.

The interpolating process for the block B'i,j differs in dependence on the movement data output of the movement detection circuit 305. In the case where the block Bi,j+1 has no movement, the output of the movement detection circuit 305 is set to "0". The switch SW1 is connected to the (a) terminal. The interframe interpolating process is executed to the block B'i,j.

When the block Bi,j+1 has a movement, the output of the movement detection circuit 305 is set to "1". The switch SW1 is connected to the (b) terminal. The intrafield interpolating process is executed to the block B'i,j.

Similarly, the interpolating process for the block Bi,j differs in dependence on the movement data output of the second delay circuit 309. When the block Bi,j−1 has no movement, the movement data output of the second delay circuit 309 is connected to the (e) terminal. The interframe interpolating process is executed to the block Bi,j.

When the block Bi,j−1 has a movement, the movement data output of the second delay circuit 309 is set to "1". The switch SW1 is connected to the (f) terminal. The intrafield interpolating process is executed to the block Bi,j.

As described above, according to this embodiment, even in the case where the movement data of the upper and lower blocks of the error block differ, the upper half portion and lower half portion of the error block can be respectively independently interpolated, so that the interpolation can be executed by an image of a high correlation. A deterioration of the picture quality of the reproduction image can be suppressed.

In the embodiment, although this linear interpolation using the image data of the upper and lower blocks have been used for the intrafield interpolation, it is also possible to use another interpolating method such as curve approximation interpolation like an interpolation by the average value of the image data of the upper and lower blocks, a spline interpolation, or the like, etc.

Figures 13, 13A:
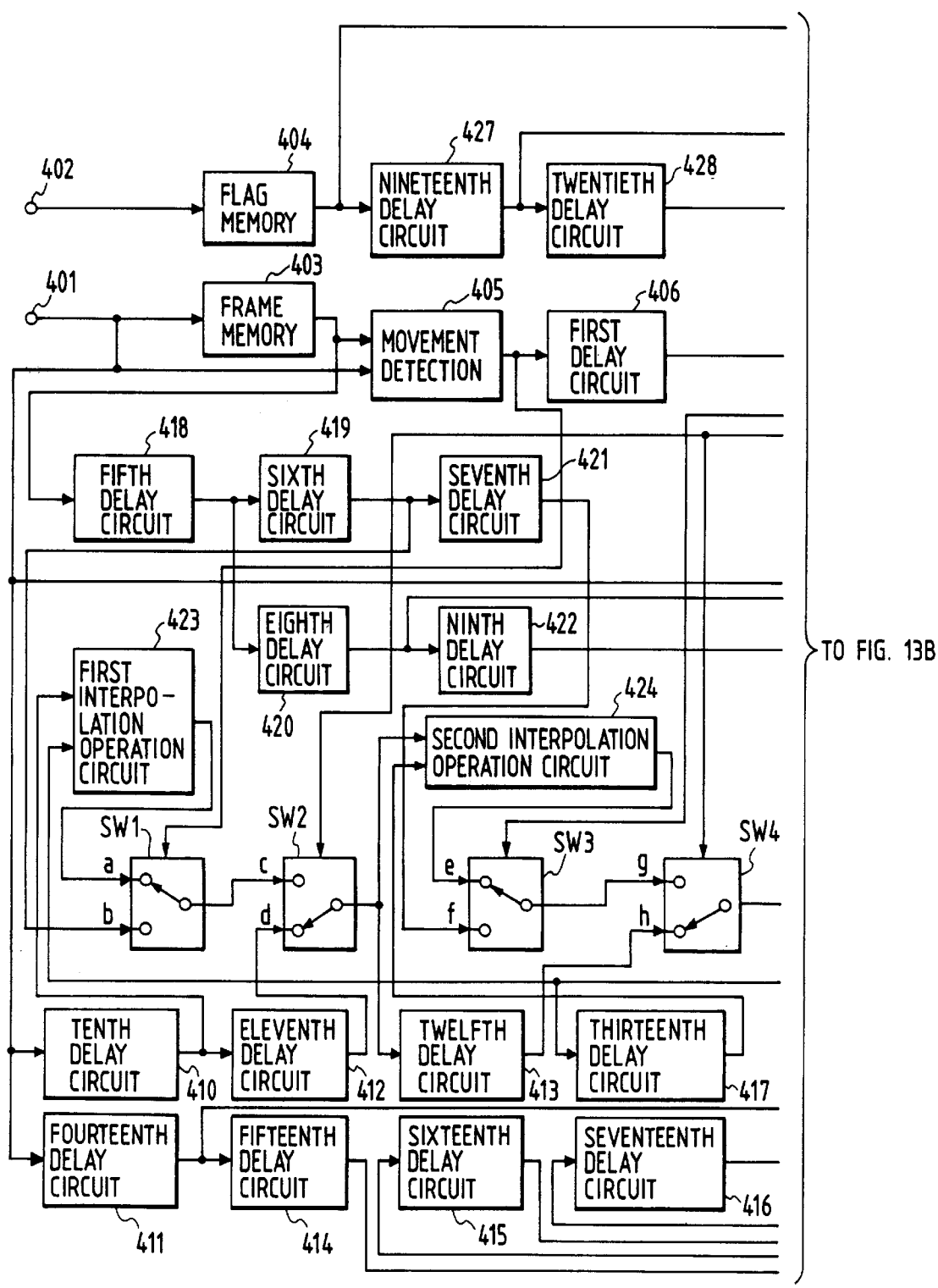
FIG. 13 which is comprised of FIGS. 13A and 13B is a block diagram showing still another construction of the interpolation circuit in the apparatus in FIG. 4.
Figure 13B:
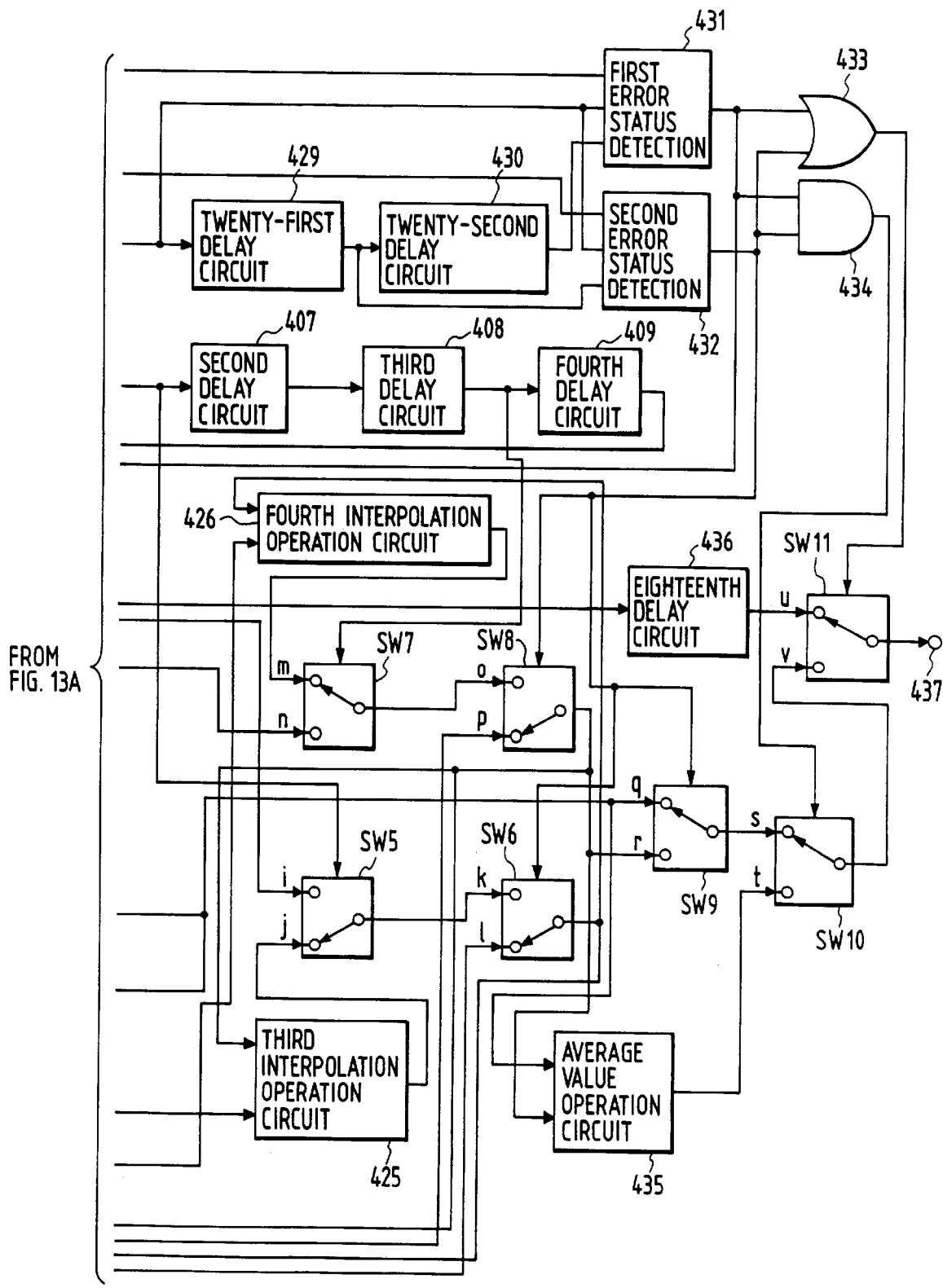

The third embodiment of the invention will now be described. FIGS. 13A and 13B are a block diagram showing further another example of a construction of the interpolation circuit 17 in FIG. 4.

Reference numeral 404 denotes a flag memory to store information of an error flag; 405 a movement detection circuit to detect a movement every block of (4 pixels)×(4 pixels); 406 a first delay circuit for delaying the output movement data of the foregoing movement detection circuit 405 by a time of one block in the upper direction and by a time of one block to the right; 407 a second delay circuit for delaying the output movement data of the movement detection circuit 405 by a time of one block in the upper direction; 408 a third delay circuit for delaying the output movement data of the movement detection circuit 405 by a time of one block in the upper direction and by a time of one block to the left; and 409 a fourth delay circuit for delaying the output movement data of the movement detection circuit 405 by a time of two blocks in the upper direction.

Reference numeral 410 denotes a tenth delay circuit for delaying the image signal by a time of four pixels; 411 a fourteenth delay circuit for delaying the image signal by a time of four lines; 412 an eleventh delay circuit for delaying the image signal by a time of two lines; 413 a twelfth delay circuit for delaying the image signal by a time of four lines; 414 a fifteenth delay circuit for delaying the image signal by a time of four pixels; 415 a sixteenth delay circuit for delaying the image signal by a time of two pixels; 416 a seventeenth delay circuit for delaying the image signal by one pixel; and 417 a thirteenth delay circuit for delaying the image signal by a time of (two lines+one pixel).

Reference numeral 418 denotes a fifth delay circuit for delaying the image signal by a time of four pixels; 419 a sixth delay circuit for delaying the image signal by a time of two lines; 420 an eighth delay circuit for delaying the image signal by a time of (four lines−two pixels); 421 a seventh delay circuit for delaying the image signal by a time of two lines; 422 a ninth delay circuit for delaying the image signal by a time of two pixels; 423 to 426 first to fourth interpolation operation circuits each for calculating an intrafield interpolation signal from two image signals; 427 a nineteenth delay circuit for delaying the error flag from the flag memory 104 by a time of one block in the upper direction and by a time of one block to the right; 428 a twentieth delay circuit for delaying the error flag from the 19th delay circuit 427 by a time of one block; and 429 a twenty-first delay circuit for delaying the error flag from the 20th delay circuit 428 by a time of one block.

Reference numeral 430 denotes a twenty-second delay circuit for delaying the error flag from the 21st delay circuit 429 by a time of one block in the upper direction and by a time of one block to the right; 431 and 432 first and second error status detection circuits for detecting error statuses in the vertical and lateral directions; 433 and 434 first and second logical operation circuits for performing predetermined logical operations; 435 an average value operation circuit to calculate an average value of the two image signals; and 436 an eighteenth delay circuit for delaying the image signal by a time of (four lines+one pixel).

SW1 to SW11 denote first to eleventh switches each for selectively outputting either one of two inputs.

The operation in the construction shown in FIGS. 13A and 13B will now be described.

In FIGS. 13A and 13B, the image data which was output from the frame memory 16 is input from an input terminal 401. The error flag corresponding to the input image data is input from an input terminal 402. The input image data is written into a frame memory 403 in accordance with the error flag.

Reference numeral 405 denotes the movement detection circuit for obtaining a difference between the input image data and an output of the frame memory 403, for addition integrating the difference every block, and thereafter, for comparing the product sum value with a predetermined value. As a result of the comparison, when the addition integration value is smaller than a predetermined value, the movement detection circuit 405 decides that there is no movement with respect to the block. A high level signal of "1" is generated.

When the addition integration value is larger than the predetermined value, it is decided that the block has a movement, so that a low level signal of "0" is generated.

Reference numerals 406 to 409 denote the first to fourth delay circuits. Movement data which was delayed by predetermined delay times is output from the first to fourth delay circuits 406 to 409. The movement detection circuit 405 generates movement data of the block which is output from the tenth delay circuit 410. The first delay circuit 406 outputs the movement data of the block which is output from the 14th delay circuit 411.

Delay times of the second delay circuit 407, the third delay circuit 408, and the fourth delay circuit 409 are set in a manner such that the second delay circuit 407 generates the movement data of the blocks which are output from the 11th delay circuit 412, the 12th delay circuit 413, the 15th delay circuit 414, and the 16th delay circuit 415, the third delay circuit 408 generates the movement data of the block which is output from the 17th delay circuit 416, and the fourth delay circuit 409 generates the movement data of the block which is output from the 13th delay circuit 417, respectively.

The output of the frame memory 403 is input to the sixth delay circuit 419 and the eighth delay circuit 420 through the fifth delay circuit 418. A delay time of the sixth delay circuit 419 is set so that the output of the sixth delay circuit 419 is set to the data of just one frame prior to the output of the 11th delay circuit 412.

A delay time of the eighth delay circuit 420 is set so that the output of the eighth delay circuit 420 is set to the data of just one frame prior to the output of the 15th delay circuit 414. The output of the sixth delay circuit 419 is sent to the seventh delay circuit 421.

A delay time of the seventh delay circuit 421 is set so that the output of the seventh delay circuit 421 is set to the data of just one frame prior to the output of the 12th delay circuit 413.

The output of the eighth delay circuit 420 is supplied to the ninth delay circuit 422. A delay time of the ninth delay circuit 422 is set so that the output of the ninth delay circuit 422 is set to the data of just one frame prior to the output of the 16th delay circuit 415.

Reference numeral 423 denotes the first interpolation operation circuit. The outputs of the tenth delay circuit 410 and the switch SW4 are input to the first interpolation operation circuit 423. The first interpolation operation circuit 423 calculates intrafield interpolation data from those inputs.

Reference numeral 424 denotes the second interpolation operation circuit. The outputs of the 13th delay circuit 417 and the switch SW2 are input to the second interpolation operation circuit 424. The second interpolation operation circuit 424 calculates intrafield interpolation data from those inputs.

Reference numeral 425 denotes the third interpolation operation circuit. The outputs of the 14th delay circuit 411 and the switch SW8 are input to the third interpolation operation circuit 425. The third interpolation operation circuit 425 calculates intrafield interpolation data from those inputs.

Reference numeral 426 denotes the fourth interpolation operation circuit. The outputs of the 17th delay circuit 416 and the switch SW6 are input to the fourth interpolation operation circuit 426. The fourth interpolation operation circuit 426 calculates intrafield interpolation data from those inputs.

An output of the first interpolation operation circuit 423 is input to the (a) terminal of the switch SW1 and the output of the sixth delay circuit 419 is input to the (b) terminal. When the movement data which is output from the movement detection circuit 405 is equal to "0", the switch SW1 is connected to the (a) terminal, thereby deriving the output of the first interpolation operation circuit as intrafield interpolation data. When the movement data which is output from the movement detection circuit 405 is equal to "1", the switch SW1 is connected to the (b) terminal, thereby generating the output of the sixth delay circuit as interframe interpolation data.

An output of the second interpolation operation circuit 424 is input to the (e) terminal of the switch SW3 and the output of the seventh delay circuit 421 is input to the (f) terminal. When the movement data which is output from the fourth delay circuit 409 is equal to "0", the switch SW3 is connected to the (e) terminal, thereby generating the output of the second interpolation operation circuit as intrafield interpolation data.

When the movement data which is output from the fourth delay circuit 409 is equal to "1", the switch SW3 is connected to the (f) terminal, thereby generating the output of the 13th delay circuit as an interframe interpolation data.

An output of the eighth delay circuit 420 is input to the (i) terminal of the switch SW5 and the output of the third interpolation operation circuit 425 is input to the (j) terminal. When the movement data which is output from the first delay circuit 406 is equal to "0", the switch SW5 is connected to the (j) terminal, thereby deriving the output of the third interpolation operation circuit as intrafield interpolation data. When the movement data which is output from the first delay circuit 406 is equal to "1", the switch SW5 is connected to the (i) terminal, thereby generating the output of the eighth delay circuit 420 as interframe interpolation data.

An output of the fourth interpolation operation circuit 426 is input to an (m) terminal of the switch SW7 and the output of the ninth delay circuit 422 is input to an (n) terminal. When the movement data which is output from the third delay circuit 408 is equal to "0", the switch SW7 is connected to the (m) terminal, thereby generating the output of the fourth interpolation operation circuit as intrafield interpolation data. When the movement data which is output from the third delay circuit 408 is equal to "1", the switch SW7 is connected to the (n) terminal, thereby generating the output of the ninth delay circuit 422 as interframe interpolation data.

Reference numerals 427 to 430 denote the 19th to 22nd delay circuits. Error flags which were delayed by predetermined times are generated from the 19th to 22nd delay circuits. A delay time of the flag memory 404 is set so as to generate an error flag of the block which is output from the tenth delay circuit 410.

A delay time of the 19th delay circuit 427 is set so as to generate an error flag of the block which is output from the 14th delay circuit 411.

A delay time of the 20th delay circuit 428 is set so as to generate error flags of the blocks which are output from the 11th delay circuit 412, the 12th delay circuit 413, the 15th delay circuit 414, and the 16th delay circuit 415.

A delay time of the 21st delay circuit 429 is set so as to generate an error flag of the block which is output from the 13th delay circuit 417. A delay time of the 22nd delay circuit 430 is set so as to generate an error flag of the block which is output from the 17th delay circuit 416.

Reference numeral 431 denotes the first error status detection circuit. An output of the first error status detection circuit 431 is set to "1" only when the error flag outputs of the flag memory 404 and the 22nd delay circuit 430 are equal to "0" and the error flag output of the 20th delay circuit 428 is equal to "1".

Reference numeral 432 denotes a second error status detection circuit. An output of the second error status detection circuit 432 is set to "1" only when the error flag outputs of the first and 21st delay circuits 427 and 429 are equal to "0" and the error flag output of the 20th delay circuit 428 is equal to "1".

Outputs of the first and second error status detection circuits 431 and 432 are input to the OR circuit 433. The OR circuit 433 executes an OR operation such that an output is set to "1" when either one of the outputs of the first and second error status detection circuit 431 and 432 which are input to the OR circuit 433 is equal to "1".

The outputs of the first and second error status detection circuits 431 and 432 are also input to the AND circuit 434. The AND circuit 434 executes an AND operation such that an output is set to "1" when both of the outputs of the first and second error status detection circuits 431 and 432 which are input to the AND circuit 434 are equal to "1".

The switches SW2 and SW4 are controlled by the output of the first error status detection circuit 431. When the output of the first error status detection circuit 431 is equal to "1", the switch SW2 is connected to the (c) terminal, thereby generating the output of the switch SW1 as interpolation data.

When the output of the first error status detection circuit 431 is equal to "0", the switch SW2 is connected to the (d) terminal, thereby generating the output of the 11th delay circuit 412 as image data which was correctly reproduced.

Similarly, when the output of the first error status detection circuit 431 is equal to "1", the switch SW4 is connected to the (g) terminal, thereby generating the output of the switch SW3 as interpolation data. When the output of the error status detection circuit 431 is equal to "0", the switch SW4 is connected to the (h) terminal, thereby generating the output of the 12th delay circuit 413 as image data which was correctly reproduced.

The switches SW6 and SW8 are controlled by the output of the second error status detection circuit 432. When the output of the second error status detection circuit 432 is equal to "1", the switch SW6 is connected to a (k) terminal, thereby generating the output of the switch SW5 as interpolation data. When the output of the second error status detection circuit 432 is equal to "0", the switch SW6 is connected to an (l) terminal, thereby generating the output of the 15th delay circuit 414 as image data which was correctly reproduced.

Similarly, when the output of the second error status detection circuit 432 is equal to "1", the switch SW8 is connected to an (o) terminal, thereby generating the output of the switch SW7 as interpolation data. When the output of the second error status detection circuit 432 is equal to "0", the switch SW8 is connected to a (p) terminal, thereby generating the output of the 16th delay circuit 415 as image data which was correctly reproduced.

The output of the switch SW4 is supplied to a (q) terminal of the switch SW9 and the output of the switch SW8 is supplied to an (r) terminal. The switch SW9 is controlled by the output of the second error status detection circuit 432. When the output of the second error status detection circuit 432 is equal to "1", the switch SW9 is connected to the (r) terminal, thereby generating the output of the switch SW8 as interpolation data in the lateral direction.

When the output of the second error status detection circuit 432 is equal to "0", the switch SW9 is connected to the (q) terminal, thereby generating the output of the switch SW4 as interpolation data in the vertical direction.

Reference numeral 435 denotes the average value operation circuit. The outputs of the switches SW4 and SW8 are input to the average value operation circuit 435. The average value operation circuit 435 calculates the average value between the output of the switch SW8 as interpolation data in the lateral direction and the output of the switch SW4 as interpolation data in the vertical direction.

The output of the switch SW9 is supplied to an (s) terminal of the switch SW10 and an output of the average value operation circuit 435 is supplied to a (t) terminal. The switch SW10 is controlled by an output of the AND circuit 434. When the output of the AND circuit 434 is equal to "0", the switch SW10 is connected to the (s) terminal, thereby generating the output of the switch SW9 as either one of the outputs of the switches SW4 to SW8.

When the output of the AND circuit 434 is equal to "1", the switch SW10 is connected to the (t) terminal, thereby generating the output of the average value operation circuit 435 as an average value of the outputs of the switches SW4 to SW8.

Reference numeral 436 denotes the 18th delay circuit. The image data from the input terminal is input to the 18th delay circuit. A delay time of the 18th delay circuit 436 is set so that the timing of the output of the 18th delay circuit 436 coincides with the timings of the outputs of the 12th and 16th delay circuits 413 and 415.

The output of the 18th delay circuit 436 is input to a (u) terminal of the switch SW11. The output of the switch SW10 is input to a (v) terminal of the switch SW11.

The switch SW11 is controlled by the output of the OR circuit 433. When the output of the OR circuit 433 is equal to "0", the switch SW11 is connected to the (u) terminal, thereby generating the output of the 18th delay circuit 436 as image data which was correctly reproduced.

When the output of the OR circuit 433 is equal to "1", the switch SW11 is connected to the (v) terminal, thereby generating the output of the switch SW10 as interpolation data. The output of the switch SW11 is sent to the outside through an output terminal 437.

Figure 14:
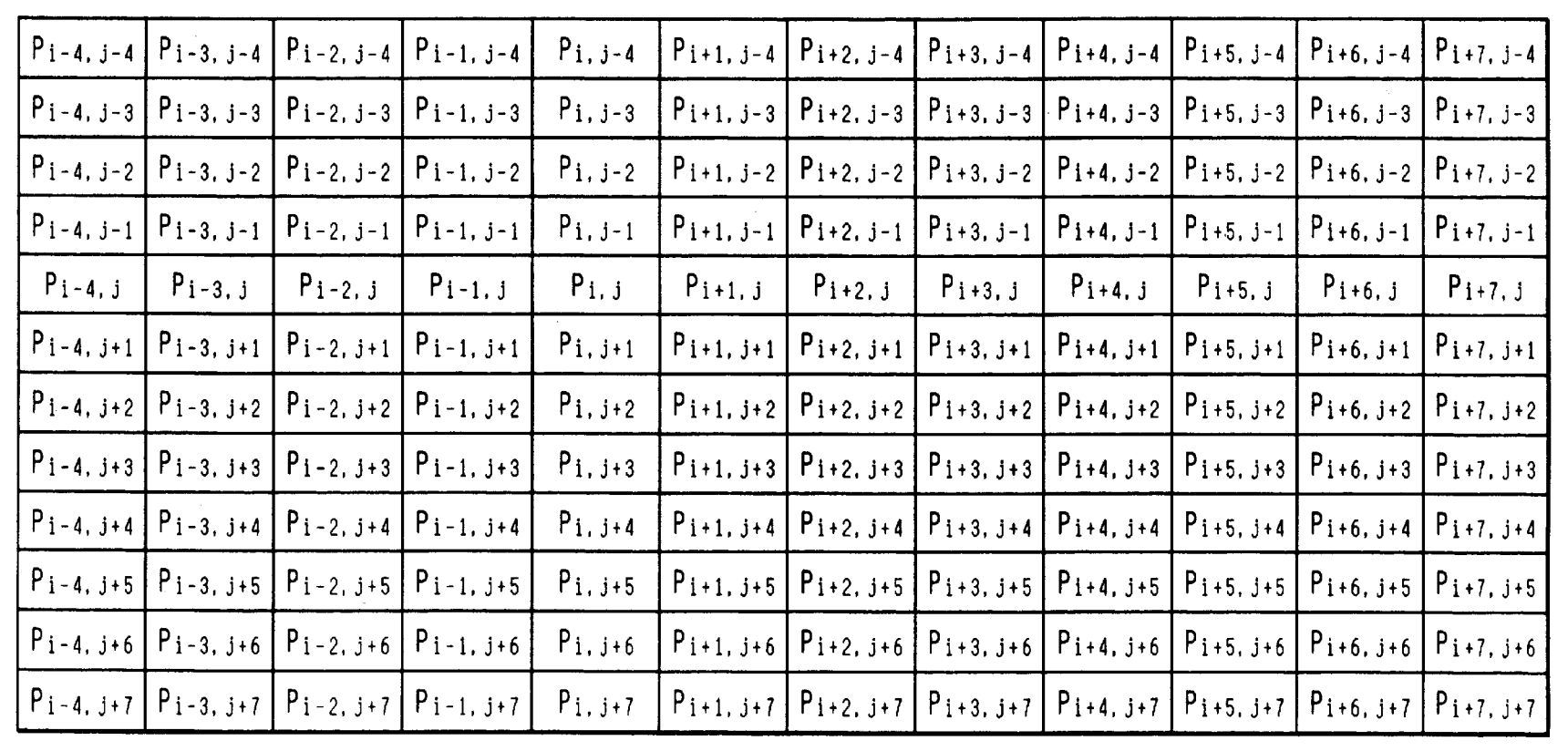

The operation will now be described with reference to FIGS. 10 and 14. FIG. 14 shows pixels on the screen.

There is a correspondence relation between the blocks in FIG. 10 and the pixels in FIG. 14. For example, the block Bi,j in FIG. 10 is constructed by (four pixels)×(four pixels) of Pi,j, Pi+1,j, Pi+2,j, Pi+3,j, Pi,j+1, Pi+1,j+1, Pi+2,j+1, Pi+3,j+1, Pi,j+2, Pi+1,j+2, Pi+2,j+2, Pi+3,j+2, Pi,j+3, Pi+1, j+3, Pi+2,j+3, and Pi+3,j+3 in FIG. 14.

Now, assuming that the pixel data of Pi+4,j+4 is generated from the input terminal, the pixel data of Pi,j+4 is output from the 10th delay circuit 410, the pixel data of Pi,j+2 is output from the 11th delay circuit 412, the pixel data of Pi,j is output from the 12th delay circuit 413, and the pixel data of Pi,j−1 is output from the 13th delay circuit 417.

The pixel data of Pi+4,j is output from the 14th delay circuit 411, the pixel data of Pi+2,j is output from the 15th delay circuit 414, the pixel data of Pi,j is output from the 16th delay circuit 415, and the pixel data of Pi−1,j is output from the 17th delay circuit 416, respectively.

The pixel data of Pi,j+4 of one frame preceding is generated from the fifth delay circuit 418. The pixel data of Pi,j+2 of one frame preceding is generated from the sixth delay circuit 419. The pixel data of Pi,j of one frame preceding is generated from the seventh delay circuit 421. The pixel data of Pi+2,j of one frame preceding is generated from the eighth delay circuit 420. The pixel data of Pi,j of one frame preceding is generated from the ninth delay circuit 422.

With respect to the movement data, the movement data of the block $B_{i,j-1}$ is generated from the movement detection circuit 405. The movement data of the block $B_{i-1,j}$ is generated from the first delay circuit 406. The movement data of the block $B_{i,j}$ is generated from the second delay circuit 407. The movement data of the block $B_{i+1,j}$ is generated from the third delay circuit 408. The movement data of the block $B_{i,j+1}$ is generated from the fourth delay circuit 409.

With respect to the error flag, the error flag of the block $B_{i,j-1}$ is generated from the flag memory 404. The error flag of the block $B_{i-1,j}$ is generated from the 19th delay circuit 427. The error flag of the block $B_{i,j}$ is generated from the 20th delay circuit 428. The error flag of the block $B_{i+1,j}$ is generated from the 21st delay circuit 429. The error flag of the block $b_{i,j+1}$ is generated from the 22nd delay circuit 430.

The pixel data of $P_{i,j+4}$ and $P_{i,j}$ is input to the first interpolation operation circuit 423, by which interpolation data of $P_{i,j+2}$ is calculated.

The pixel data of $P_{i,j-1}$ and $P_{i,j+2}$ is input to the second interpolation operation circuit 424, by which pixel data of $P_{i,j}$ is calculated.

The pixel data of $P_{i+4,j}$ and $P_{i,j}$ is input to the third interpolation operation circuit 425, by which pixel data of $P_{i+2,j}$ is calculated.

The pixel data of $P_{i-1,j}$ and $P_{i+2,j}$ is input to the fourth interpolation operation circuit 426, by which pixel data of $P_{i,j}$ is calculated.

When the movement data of the block $B_{i,j+1}$ is equal to "1", the switch SW1 generates the pixel data (interframe interpolation data) of $P_{i,j+2}$ of one frame preceding. When the movement data is equal to "0", the switch SW1 generates the intrafield interpolation data of $P_{i,j+2}$ which is output from the first interpolation circuit 423. Namely, a control is performed on the basis of the movement data of the lower block of the error block.

The first error status detection circuit 431 generates a "1" signal only when the error flags of the blocks $B_{i,j-1}$ and $B_{i,j+1}$ are equal to "0" and the error flag of the block $B_{i,j}$ is equal to "1".

When the output of the first error status detection circuit 431 is equal to "1", an error exists in the block $B_{i,j}$ which is interpolated and no error exists in the blocks $B_{i,j-1}$ and $B_{i,j+1}$ which are used in the intrafield interpolation. Therefore, the switch SW2 generates the interpolation data of $P_{i,j+2}$.

When the movement data of the block $B_{i,j-1}$ is equal to "1", the switch SW3 generates the pixel data (interframe interpolation data) of $P_{i,j}$ of one frame preceding. When the movement data is equal to "0", the switch SW3 generates the intrafield interpolation data of $P_{i,j}$ which is output from the second interpolation operation circuit 424. Namely, a control is performed on the basis of the movement data of the upper block of the error block.

In a manner similar to the switch SW2, when the output of the first error status detection circuit 431 is equal to "1", an error exists in the block $B_{i,j}$ to be interpolated and no error exists in the blocks $B_{i,j-1}$ and $B_{i,j+1}$ which are used in the intrafield interpolation. Therefore, the switch SW4 generates the interpolation data of $P_{i,j}$. As mentioned above, the intrafield interpolation in the vertical direction is executed by the first interpolation operation circuit 423 and the second interpolation operation circuit 424.

When the movement data of the block $B_{i+1,j}$ is equal to "1", the switch SW5 generates the pixel data (interframe interpolation data) of $P_{i+2,j}$ of one frame preceding. When the movement data is equal to "0", the switch SW5 generates the intrafield interpolation data of $P_{i+2,j}$ which is output from the third interpolation operation circuit 425. Namely, a control is performed on the basis of the movement data of the right block of the error block.

The second error status detection circuit 432 generates a "1" signal only when the error flags of the blocks $B_{i-1,j}$ and $B_{i+1,j}$ are equal to "0" and the error flag of the block $B_{i,j}$ is equal to "1".

When the output of the first error status detection circuit 431 is equal to "1", an error exists in the block $B_{i,j}$ which is interpolated and no error exists in the blocks $B_{i-1,j}$ and $B_{i+1,j}$ which are used for the intrafield interpolation. Therefore, the switch SW6 generates the interpolation data of $P_{i+2,j}$.

When the movement data of the block $B_{i-1,j}$ is equal to "1", the switch SW7 generates the pixel data (interframe interpolation data) of $P_{i,j}$ of one frame preceding. When the movement data is equal to "0", the switch SW7 generates the intrafield interpolation data of $P_{i,j}$ which is output from the fourth interpolation operation circuit 426. Namely, a control is performed on the basis of the movement data of the left block of the error block.

In a manner similar to the switch SW2, when the output of the second error status detection circuit 431 is equal to "1", an error exists in the block $B_{i,j}$ which is interpolated and no error exists in the blocks $B_{i-1,j}$ and $B_{i+1,j}$ which are used for the intrafield interpolation. Therefore, the switch SW8 generates the interpolation data of $P_{i,j}$. As mentioned above, the intrafield interpolation in the lateral direction is executed by the OR circuit 425 and the AND circuit 426.

In this instance, the interpolation data of $P_{i,j}$ is generated as outputs of the switches SW4 and SW8. The interpolation data in the vertical direction is generated as an output of the switch SW4. The interpolation data in the lateral direction is generated as an output of the switch SW8. Those interpolation data are switched by the switch SW9 and is generated.

The switch SW9 is controlled so as to ordinarily generate the interpolation data in the vertical direction. When the output of the second error status detection circuit 432 is equal to "1", the interpolation data in the lateral direction is generated.

On the other hand, the average value of the interpolation data in the vertical direction and the interpolation data in the lateral direction is generated from the average value operation circuit 435.

The switch SW10 is controlled by the output of the AND circuit 434 and generates the output of the average value operation circuit 435 only when both of the interpolation data in the vertical direction and the interpolation data in the lateral direction can be obtained.

In the case where the interpolation data in the vertical direction can be obtained by the switches SW9 and SW10 and the average value operation circuit 435, the interpolation data in the vertical direction is generated. In the case where the interpolation data in the lateral direction can be obtained, the interpolation data in the lateral direction is generated. In the case where both of the interpolation data in the vertical direction and the interpolation data in the lateral direction can be obtained, the average value of them is generated to the (v) terminal of the switch SW11. In this instance, the pixel data of $P_{i,j}$ which is not subjected to various kinds of processes is generated from the 18th delay circuit 436 and is supplied to the (u) terminal of the switch SW11.

The switch SW11 is controlled by the OR circuit 433. In the case where an error exists in the block $B_{i,j}$ and either one of the interpolation data in the vertical direction and the interpolation data in the lateral direction can be obtained, the interpolation data is output to the outside.

According to the embodiment as described above, since the interpolation data is selected on the basis of the movement data of each of the blocks which are adjacent to the error block in the upper and lower directions and in the right and left directions, the interpolation data suitable for each portion of the error block can be selected.

On the other hand, since two interpolation data in the vertical and lateral directions are formed as intrafield interpolation data and the intrafield interpolation data and the interframe interpolation data are switched on the basis of the error statuses in the vertical and lateral directions or the average value of those two interpolation data is obtained and generated. Therefore, even in the case where error data exists in the block which is adjacent to the error block, the effective interpolation can be executed in accordance with the error status. The deterioration of the picture quality can be prevented.

Although the embodiment has been described by using the block of the (4×4) pixels, it is also possible to use a block of another construction such as (8×8), (4×8), (8×32), or (4×32), etc. As a process in the case where both of the interpolation data in the vertical direction and the interpolation data in the lateral direction can be obtained, the average value is generated in the embodiment. However, it is also possible to preferentially generate either one of them.

According to the second and third embodiments of the invention as described above, even when a range of the error block is large and a portion such that the correlation with the data which is used for the interpolation is small exists in the block to be interpolated, a situation such that the interpolation is performed for the whole block by the data of a small correlation is eliminated. Therefore, since the picture quality of the image to be interpolated doesn't deteriorate, even in the case where the pixel block to be interpolated is large, a good interpolation can be performed and the deterioration of the interpolation image can be reduced.

Figure 15:
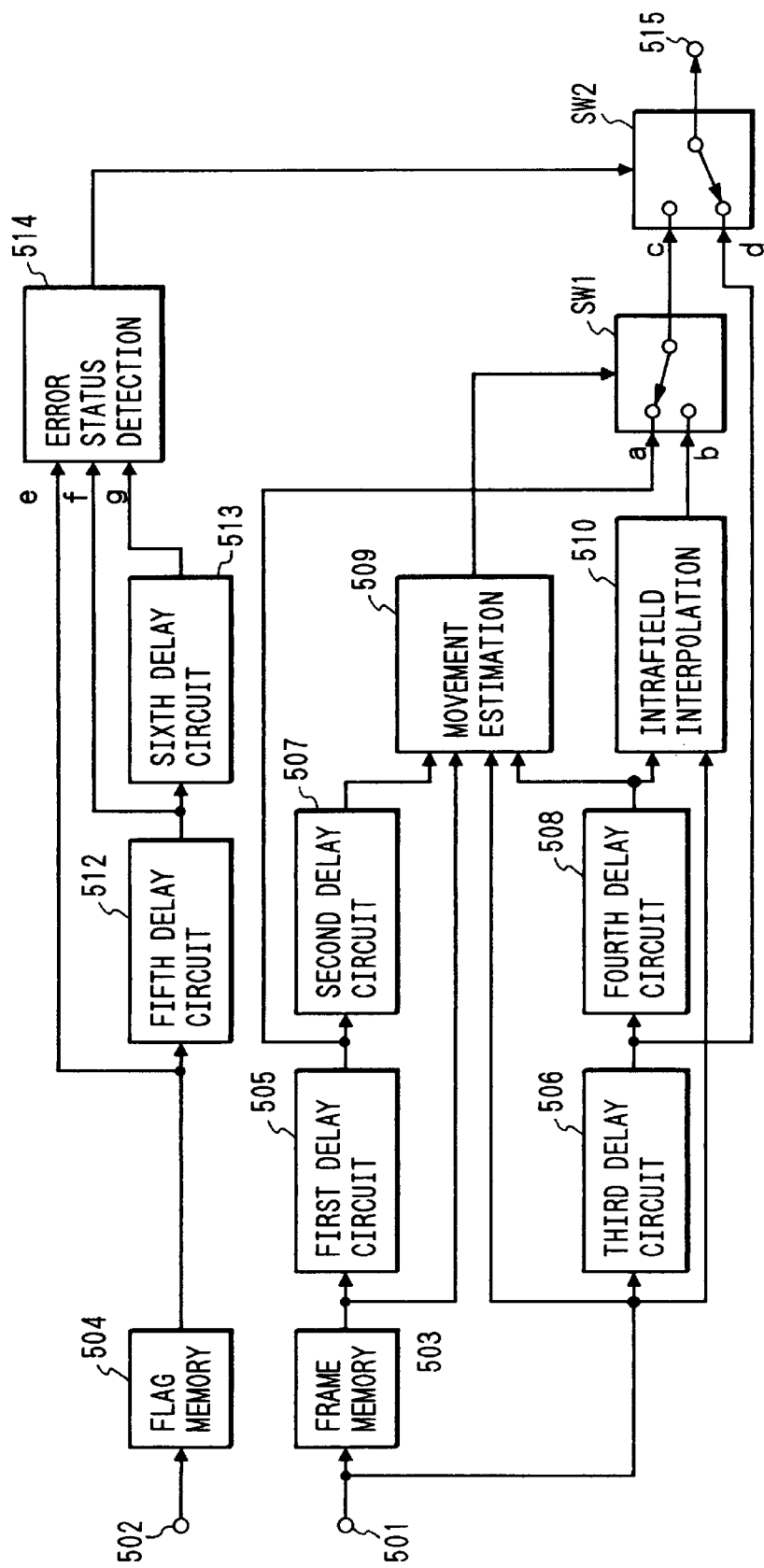
FIG. 15 is a block diagram showing further another construction of the interpolation circuit in FIG. 4.

The fourth embodiment of the invention will now be described. FIG. 15 is a block diagram showing further another construction example of the interpolation circuit 17 in FIG. 4.

In FIG. 15, the image data generated from the frame memory 16 is input from an input terminal 501. An error flag corresponding to the input image data is input from an input terminal 502. The input image data is written into a frame memory 503 in accordance with the error flag. Reference numeral 505 denotes a first delay circuit to delay an input signal by a time of 4H. A delay time of the first delay circuit 505 is set so that an output of the first delay circuit 505 becomes the data of just one frame preceding to an output of a third delay circuit 506 to delay an input signal by a time of 4H, which will be explained herein.

The output of the first delay circuit 505 is input to a second delay circuit 507 to delay an input signal by a time of 4H. A delay time of the second delay circuit 507 is set so that an output of the second delay circuit 507 becomes the data of just one frame preceding to an output of a fourth delay circuit 508 to delay an input signal by a time of 4H, which will be explained hereinlater. The outputs of the first to fourth delay circuits are input to a movement estimation circuit 509, respectively.

The movement estimation circuit 509 obtains a difference between the input image data and the output of the frame memory 503 and a difference between the outputs of the second and fourth delay circuits 507 and 508 and addition integrates all of the absolute values of the difference data and, after that, compares the addition integration value with a predetermined value.

As a result of the comparison, when the addition integration value is smaller than a predetermined value, the movement estimation circuit 509 judges that there is no movement, so that a low level signal "0" is generated. When the addition integration value is larger than the predetermined value, it is judged that there is a movement, so that a high level signal "1" is generated.

Reference numeral 510 denotes an intrafield interpolation circuit. The intrafield interpolation circuit 510 generates intrafield interpolation data from the input image data and the output of the fourth delay circuit 508. An output of the intrafield interpolation circuit 510 is input to the (b) terminal of the switch SW1.

The switching operation of the switch SW1 is controlled by an output of the movement estimation circuit 509. When the output of the movement estimation circuit 509 is equal to "0", the switch SW1 is connected to the (a) terminal. When it is equal to "1", the switch SW1 is connected to the (b) terminal. That is, in the case where it is presumed that there is no movement, the output (interframe interpolation data) of an fifth delay circuit 512 as image data of one frame preceding is selected. In the case where it is presumed that there is a movement, the interpolation data (intrafield interpolation data) which is calculated by the intrafield interpolation circuit 510 from the input image data and the output of the third delay circuit 506 is selected.

The output of the switch SW1 is input to the (c) terminal of the switch SW2. By the switch SW2, either one of the output of the switch SW1 as interpolation data and the output data of the third delay circuit 506 which is not subjected to the processes as mentioned above is selected.

The output of the flag memory 504 is supplied to the fifth delay circuit 512. A delay time of the fifth delay circuit 512 is set so as to generate the error flag of the block that is output from the third delay circuit 506.

An output of a sixth delay circuit 513 is supplied to an error status detection circuit 514. A delay time of the sixth delay circuit 513 is set so as to generate an error flag of the block that is output from the fourth delay circuit 508.

The outputs of the flag memory 504, fifth delay circuit 512, and sixth delay circuit 513 are supplied to the error status detection circuit 514, respectively. The error status detection circuit 514 performs a predetermined arithmetic operation from the error flags which were input and generates a signal to control the switch SW2.

The output of the switch SW1 is supplied to the (c) terminal of the switch SW2 and the output of the third delay circuit 506 is supplied to the (d) terminal. When an output of the error status detection circuit 514 is equal to "0", the switch SW2 is connected to the (d) terminal. When it is equal to "1", the switch SW2 is connected to the (c) terminal. Thus, either one of the output of the switch SW1 and the output of the third delay circuit 506 as image data that is not subjected to the processes as mentioned above is selected and is output to the outside through an output terminal 515.

For example, the error status detection circuit 514 is constructed by an AND circuit similar to that in FIG. 7 and generates a "1" signal only when the inputs from input terminals (g and i) are equal to "0" and the input from an input terminal (h) is equal to "1".

Figure 16:
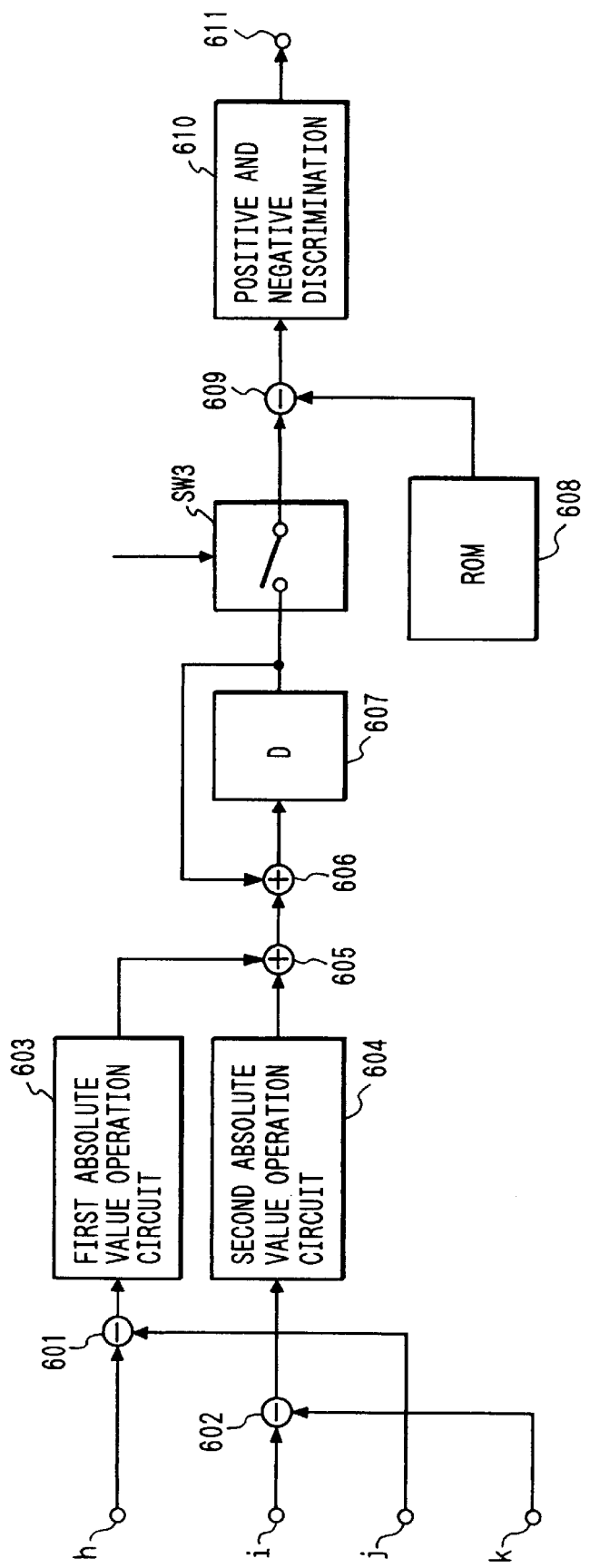
FIG. 16 is a diagram for explaining the interpolating operation according to a circuit in FIG. 15.

FIG. 16 shows an example of a construction of the movement estimation circuit 509 in the embodiment. In FIG. 16, reference numeral 601 denotes a first subtraction circuit to perform a subtraction between the input signals at the input terminals (h and j); 602 a second subtraction circuit to perform a subtraction between the input signals at the input terminals (i and k); 603 a first absolute value operation circuit to calculate the absolute value of an output signal of the first subtraction circuit 601; 604 a second absolute value operation circuit to calculate the absolute value of an output signal of the second subtraction circuit 602; and 605 a first addition circuit to add outputs of the first and second absolute value operation circuits 603 and 604.

Reference numeral 606 denotes a second addition circuit to add an output of the first addition circuit 605 and an output of a delay circuit 607, which will be explained hereinlater; 607 the delay circuit to delay an output of the second addition circuit; 608 a read only memory (ROM) in which data to compare with an output of the delay circuit 607 has previously been stored; SW3 a switch which is controlled by a control circuit (not shown); 609 a third subtraction circuit to calculate a difference between an output of the switch SW3 and an output of the ROM 608; 610 a positive and negative discrimination circuit to discriminate whether the output result of the third subtraction circuit 609 is positive or negative; and 611 an output terminal. The input terminals (h, i, j, k) correspond to the input terminals (not shown) provided for the movement estimation circuit 9 in FIG. 15, respectively.

The operation of the movement estimation circuit in FIG. 16 will now be described. The image signal from the second delay circuit 507 is input to the input terminal (h). The image signal from the fourth delay circuit is input to the input terminal (i). Since those two image signals have a time difference of just one frame, the movement data of the upper block of the error block is derived from those image signals. That is, when paying an attention to certain one pixel, in the case where the movement is small on the screen, the absolute value of the difference for one frame is small, so that the output of the first absolute value operation circuit 603 decreases.

On the other hand, when the movement is large on the screen, since the absolute value of the difference for one frame is large, the output of the first absolute value operation circuit 603 increases. Similarly, the image signal from the frame memory is input to the input terminal (j). The input image signal is input to the input terminal (k). Since those two image signals have a time difference of just one frame, the movement data of the lower block of the error block is derived from those image signals. That is, when the movement is small, an output of the second absolute value operation circuit 604 is small. When the movement is large on the screen on the contrary, the output of the second absolute value operation circuit 604 increases.

The outputs of the first and second absolute value operation circuits 603 and 604 are added by the first addition circuit 605. An output of the first addition circuit 605 will now be referred to as a differential absolute value hereinafter.

The second addition circuit 606 and delay circuit 607 add the foregoing differential absolute value with respect to one pixel block. The control circuit (not shown) controls the delay circuit 607 every block so as to add the differential absolute value for one block. After the differential absolute values of one block were addition integrated, the switch SW3 is closed and the addition integration value is supplied to the third subtraction circuit 609. An output of the delay circuit 607 will now be referred to as a differential absolute value sum hereinafter.

The third subtraction circuit 609 executes a subtraction between the above differential absolute, value sum and the comparison value having the predetermined value which was read out from the ROM 608. The positive and negative discrimination circuit 610 discriminates whether the output of the third subtraction circuit 609 is positive or negative, thereby comparing the comparison value which has previously been stored in the ROM 608 and the differential absolute value sum.

The positive and negative discrimination circuit 610 judges that there is a movement in the case where the differential absolute value sum is larger than the comparison value, so that a "1" signal is generated. When the differential absolute value sum is smaller than the comparison value, it is judged that there is no movement, so that a "0" signal is generated. The result of the discrimination is calculated every block. The comparison value stored previously in the ROM 608 is set to a half value of the total value of all of the pixels constructing each block or the like.

The operation of the image signal of the embodiment will now be described with reference to FIG. 10. When it is now assumed that the pixel data of the block Bi,j+1 has been input from the input terminal, the image data of Bi,j is generated from the third delay circuit 506 and the image data of Bi,j of one frame preceding is generated from the first delay circuit 505.

The image data of Bi,j−1 is generated from the fourth delay circuit 508. The image data of Bi,j−1 of one frame preceding is generated from the second delay circuit 507.

The error flag of Bi,j+1 is generated from the flag memory 504. The error flag of Bi,j is generated from the fifth delay circuit 512. The error flag of Bi,j−1 is generated from the sixth delay circuit 513.

The movement estimation circuit 509 calculates a difference between the block Bi,j+1 and Bi,j+1 of one frame preceding and addition integrates those differences for two blocks. The addition integration result is compared with a predetermined comparison value. When the addition integration data is smaller than the predetermined value, it is judged that there is no movement, and a low level signal "0" is generated. When the addition integration data is larger than the predetermined value, it is judged that there is a movement, so that a high level signal "1" is generated.

In this instance, in the case where both of the blocks Bi,j−1 and Bi,j+1 can be reproduced and the block Bi,j cannot be reproduced, the "1" signal is generated from the error status detection circuit 514. The switch SW2 is connected to the (c) terminal. The interpolation data is generated for the image data of the block Bi,j.

The interpolating process for the block Bi,j differs in dependence on the movement data output of the movement estimation circuit 509. When the movement estimation circuit 509 generates the "0" signal, the first switch SW1 is connected to the (a) terminal and the block Bi,j is subjected to the interframe interpolation. When the movement estimation circuit 509 generates the "1" signal, the first switch SW1 is connected to the (b) terminal and the block Bi,j is subjected to the intrafield interpolation.

As described above, according to the embodiment, the interframe differential absolute value sums of the upper and lower blocks of the error block are added and the movement of the error block is presumed by using the addition value. Therefore, a situation such that the movement data differs in the upper and lower blocks of the error block doesn't occur. The movement can be presumed at a high precision. Therefore, the interpolation can be executed by the image data of a high correlation. The deterioration of the picture quality of the reproduction image can be prevented.

In the foregoing embodiment, the movement has been presumed by using the differential absolute value sums of the upper and lower blocks of the error block. However, the differential absolute value sums of the right and left blocks of the error block can be also used. In such a case, a similar operation and effects are obtained.

Although each of the above embodiments has been described with respect to the case where the present invention was applied to a digital VTR, the invention can be also applied to an apparatus for receiving and reproducing (decoding) the image signal which was compressed and transmitted by the MPEG standard or the like. A similar operation and effects can be derived.

What is claimed is:

1. An image reproducing apparatus comprising:
   (a) reproducing means for reproducing pixel data which was divided into a plurality of blocks each consisting of a plurality of pixels;
   (b) error correcting means for correcting errors in the pixel data reproduced by said reproducing means;
   (c) movement detecting means for respectively detecting movements of the plurality of blocks around an error block including the pixel data uncorrectable by said error correcting means by performing an operation on the pixel data reproduced by said reproducing means and for discriminating a movement of the error block on the basis of the detected movements of the plurality of blocks around the error block;
   (d) constructing means for constructing pixel data for the error block by using the pixel data of the blocks other than the error block reproduced by said reproducing means, said constructing means constructing first pixel data and second pixel data;
   (e) correcting status detection means for detecting whether each of the plurality of blocks used to discriminate the movement of the error block by said movement detecting means, includes the uncorrectable pixel data or not; and
   (f) interpolating means for selecting one of the first and second pixel data according to the movement of the error block discriminated by said movement detecting means and the detection result of said correcting status detection means and for interpolating the error block by using the selected pixel data.

2. An apparatus according to claim 1, wherein the blocks around the block including said uncorretable pixel data are blocks on a screen including the uncorrectable pixel data.

3. An apparatus according to claim 1, wherein said constructing means includes: an intrascreen constructing circuit for constructing pixel data by using pixel data on a screen including said uncorrectable pixel data; and an interscreen constructing circuit for constructing pixel data by using pixel data on a screen which is different with respect to a time from the pixel data including said uncorrectable pixel data.

4. An apparatus according to claim 1, wherein said constructing means constructs the pixel data by using pixel data of an image including the uncorrectable pixel data, in case of that at least two of said plurality of outputs of said movement detecting means are different from each other.

5. An image processing apparatus, comprising:
   (a) reproducing means for reproducing pixel data;
   (b) correcting means for correcting errors in the pixel data reproduced by said reproducing means;
   (c) movement detecting means for detecting movements of a plurality of pixel data around target pixel data in the pixel data reproduced by said reproducing means by performing an operation on the pixel data reproduced by said reproducing means and for discriminating a movement of the target pixel data on the basis of the detected movements of the plurality of pixel data around the target pixel data;
   (d) constructing means for constructing pixel data for the target pixel data by using the plurality of pixel data around the target pixel data, said constructing means constructing first pixel data and second pixel data;
   (e) correcting status detection means for detecting whether the plurality of pixel data used to discriminate the movement of the target pixel data by said movement detecting means, are correctable or not; and
   (f) interpolating means for selecting one of the first and second pixel data according to the movement of the target pixel data discriminated by said movement detecting means and the detection result of said correcting status detection means and for interpolating the target pixel data by using the selected pixel data.

6. An apparatus according to claim 5, wherein said pixel data reproduced by sad reproducing means is pixel data which was divided into blocks and encoded, and said movement detecting means detects a movement on a block unit basis.

7. An apparatus according to claim 5, wherein said target pixel data is pixel data which is not correctable.

8. An apparatus according to claim 5, wherein said constructing means can construct the pixel data by different methods for a part and another part in a block including said target pixel data in accordance with a plurality of outputs of said movement detecting means.

9. An apparatus according to claim 8, wherein said constructing means can construct pixel data by using only the pixel data of a screen including said target pixel data for one part of a block including said target pixel data and can construct pixel data by using the pixel data on a screen which is different with respect to a time from at least the pixel data including said target pixel data for another part.

10. An image processing device comprising:
    (a) input means for inputting an image signal which was divided into blocks and encoded on a unit basis of a plurality of pixels; and
    (b) concealing means for concealing an erroneous block in said image signal by using the other blocks,
    wherein said concealing means divides said erroneous block into at least two blocks and performs concealment of one of the at least two divided blocks by using pixels of a frame including the erroneous block and concealment of the other of the at least two divided block by using pixels of a frame different from the frame including the erroneous block.

11. A device according to claim 10, wherein said pixel data is pixel data which was divided into blocks and encoded, and said movement detecting means detects the presence or absence of the movement of said encoding block.

12. A device according to claim 11, further comprising decoding means for decoding the image signal which was input by said input means, and
    wherein the erroneous block is a block including the image signal which cannot be decoded by said decoding means.

13. A device according to claim 11, further comprising, decoding means for decoding the pixel data which was reproduced by said reproducing means, and
    wherein said target block is a block including the pixel data which cannot be decoded by said decoding means.

14. An image processing device comprising:
(a) reproducing means for reproducing pixel data which was divided into a plurality of blocks each consisting a plurality of pixels;
(b) movement detecting means for performing an operation in the pixel data produced by said reproducing means and for detecting a presence or absence of a movement of each of the plurality of blocks according to the operation result; and
(c) concealing means for concealing a target block included in the plurality of blocks of the pixel data reproduced by said reproducing means by using the other blocks of the pixel data reproduced by said reproducing means according to an output of said movement detecting means, wherein said concealing means divides said target block into a plurality of portions and performs concealment of the respective divided portions respectively by different concealing methods according to a plurality of movement detection results of the plurality of blocks by said movement detecting means.

* * * * *